United States Patent
Tian et al.

(10) Patent No.: US 12,120,680 B2
(45) Date of Patent: Oct. 15, 2024

(54) DOWNLINK CONTROL INFORMATION FOR RETRANSMISSION OF SEMI-PERSISTENTLY SCHEDULED PHYSICAL DOWNLINK SHARED CHANNELS

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Mostafa Khoshnevisan, San Diego, CA (US); Zhifei Fan, San Diego, CA (US); Ahmed Abdelaziz Ibrahim Abdelaziz Zewail, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/643,298

(22) Filed: Dec. 8, 2021

(65) Prior Publication Data

US 2023/0180231 A1    Jun. 8, 2023

(51) Int. Cl.
*H04W 72/1273* (2023.01)
*H04L 1/08* (2006.01)
(Continued)

(52) U.S. Cl.
CPC ........... *H04W 72/1273* (2013.01); *H04L 1/08* (2013.01); *H04L 1/1614* (2013.01);
(Continued)

(58) Field of Classification Search
CPC .... H04W 72/1273; H04W 72/23; H04L 1/08; H04L 1/1614; H04L 1/1812; H04L 5/0053
(Continued)

(56) References Cited

U.S. PATENT DOCUMENTS

| | | | |
|---|---|---|---|
| 11,632,758 B2 * | 4/2023 | Cirik | H04W 72/23 375/267 |
| 11,646,832 B2 * | 5/2023 | Rastegardoost | H04L 5/0055 370/329 |

(Continued)

FOREIGN PATENT DOCUMENTS

| | | | | |
|---|---|---|---|---|
| JP | 2023160712 A | * | 11/2023 | ........... H04L 1/1812 |
| KR | 20230084488 A | * | 6/2023 | |

(Continued)

OTHER PUBLICATIONS

ASUSTEK: "Discussion on Mechanisms to Support Group Scheduling for RRC_CONNECTED UEs", 3GPP TSG RAN WG1 #104b-e, R1-2103658, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021 Apr. 6, 2021, XP051993461, 5 Pages, p. 3-p. 4.

(Continued)

*Primary Examiner* — Melvin H Pollack
(74) *Attorney, Agent, or Firm* — Patterson+ Sheridan, L.L.P.

(57) ABSTRACT

Certain aspects of the present disclosure provide techniques for transmitting downlink control information (DCI) to schedule retransmissions of semi-persistently scheduled (SPS) physical downlink shared channels (PDSCHs) that were not successfully received. A method that may be performed by a user equipment (UE) includes receiving a downlink control information (DCI) that schedules retransmission of at least two semi-persistently scheduled (SPS) physical downlink shared channels (PDSCHs) that have hybrid automatic retransmission request (HARD) identifier (IDs); and receiving the retransmissions of the at least two PDSCHs.

30 Claims, 14 Drawing Sheets

(51) Int. Cl.
*H04L 1/1607* (2023.01)
*H04L 1/1812* (2023.01)
*H04L 5/00* (2006.01)
*H04W 72/23* (2023.01)

(52) U.S. Cl.
CPC .......... *H04L 1/1812* (2013.01); *H04L 5/0053* (2013.01); *H04W 72/23* (2023.01)

(58) Field of Classification Search
USPC ......................................................... 370/329
See application file for complete search history.

(56) References Cited

U.S. PATENT DOCUMENTS

| | | | | |
|---|---|---|---|---|
| 11,653,336 | B2 * | 5/2023 | Bang ................ | H04W 72/1268 370/329 |
| 11,784,861 | B2 * | 10/2023 | Aldana ............. | H04W 72/1215 370/336 |
| 11,805,518 | B2 * | 10/2023 | Yeo ................... | H04W 72/0446 |
| 11,832,285 | B2 * | 11/2023 | Park ................... | H04L 5/0053 |
| 11,844,066 | B2 * | 12/2023 | Ko ..................... | H04L 1/1887 |
| 11,863,326 | B2 * | 1/2024 | Nogami ............. | H04L 1/1614 |
| 2020/0127796 | A1 * | 4/2020 | Li ...................... | H04L 1/1812 |
| 2022/0132545 | A1 * | 4/2022 | Lee ................... | H04L 1/1854 |
| 2023/0097059 | A1 * | 3/2023 | Zhang ............... | H04L 1/1812 370/329 |
| 2023/0140213 | A1 * | 5/2023 | Awadin .............. | H04L 5/0044 370/329 |
| 2023/0140467 | A1 * | 5/2023 | Lin .................... | H04L 1/1896 370/329 |
| 2023/0143581 | A1 * | 5/2023 | Myung .............. | H04W 72/1268 370/329 |
| 2023/0163887 | A1 * | 5/2023 | Cheng ................ | H04W 72/23 370/329 |
| 2023/0171038 | A1 * | 6/2023 | Yang .................. | H04L 5/0055 370/329 |
| 2023/0171039 | A1 * | 6/2023 | Lee ................... | H04L 1/1822 370/329 |
| 2023/0275735 | A1 * | 8/2023 | He ..................... | H04L 5/0092 370/329 |
| 2023/0276462 | A1 * | 8/2023 | Hwang .............. | H04W 4/46 370/329 |
| 2023/0299890 | A1 * | 9/2023 | Baek .................. | H04W 72/30 370/329 |
| 2023/0309090 | A1 * | 9/2023 | Bae .................... | H04L 1/1812 |
| 2023/0319815 | A1 * | 10/2023 | Lee ................... | H04W 72/40 370/329 |
| 2023/0319822 | A1 * | 10/2023 | Park .................. | H04W 72/1273 370/329 |
| 2023/0319842 | A1 * | 10/2023 | Nogami ............. | H04W 72/12 370/329 |
| 2023/0328730 | A1 * | 10/2023 | Kumagai ........... | H04W 72/1273 |
| 2023/0345483 | A1 * | 10/2023 | Fu ..................... | H04W 72/1273 |
| 2023/0354347 | A1 * | 11/2023 | Kim ................... | H04L 1/0009 |
| 2023/0361938 | A1 * | 11/2023 | He ..................... | H04L 1/1832 |
| 2023/0379098 | A1 * | 11/2023 | Kumagai ............ | H04W 72/11 |
| 2023/0379966 | A1 * | 11/2023 | Nogami ............. | H04W 74/0808 |
| 2023/0396298 | A1 * | 12/2023 | Bae .................... | H04W 72/20 |
| 2023/0397194 | A1 * | 12/2023 | Wang ................ | H04W 72/121 |
| 2023/0397196 | A1 * | 12/2023 | Nishio ............... | H04W 72/1268 |
| 2023/0403702 | A1 * | 12/2023 | Su ..................... | H04W 28/18 |
| 2024/0008054 | A1 * | 1/2024 | Zhang ................ | H04L 1/1822 |
| 2024/0008123 | A1 * | 1/2024 | Ying .................. | H04L 5/0055 |

FOREIGN PATENT DOCUMENTS

| | | | | |
|---|---|---|---|---|
| TW | 202335458 A | * | 9/2023 | .......... H04L 1/0061 |
| WO | 2021023531 A1 | | 2/2021 | |
| WO | WO-2023212647 A1 | * | 11/2023 | |

OTHER PUBLICATIONS

International Search Report and Written Opinion—PCT/US2022/078382—ISA/EPO—Jan. 20, 2023.

\* cited by examiner

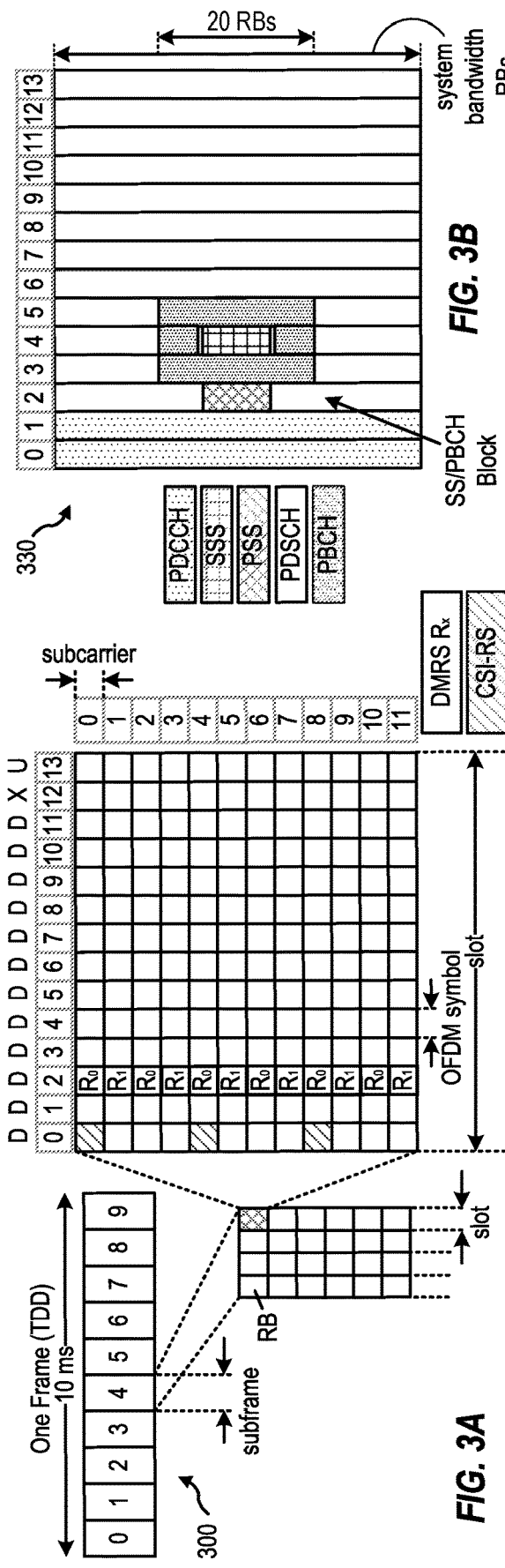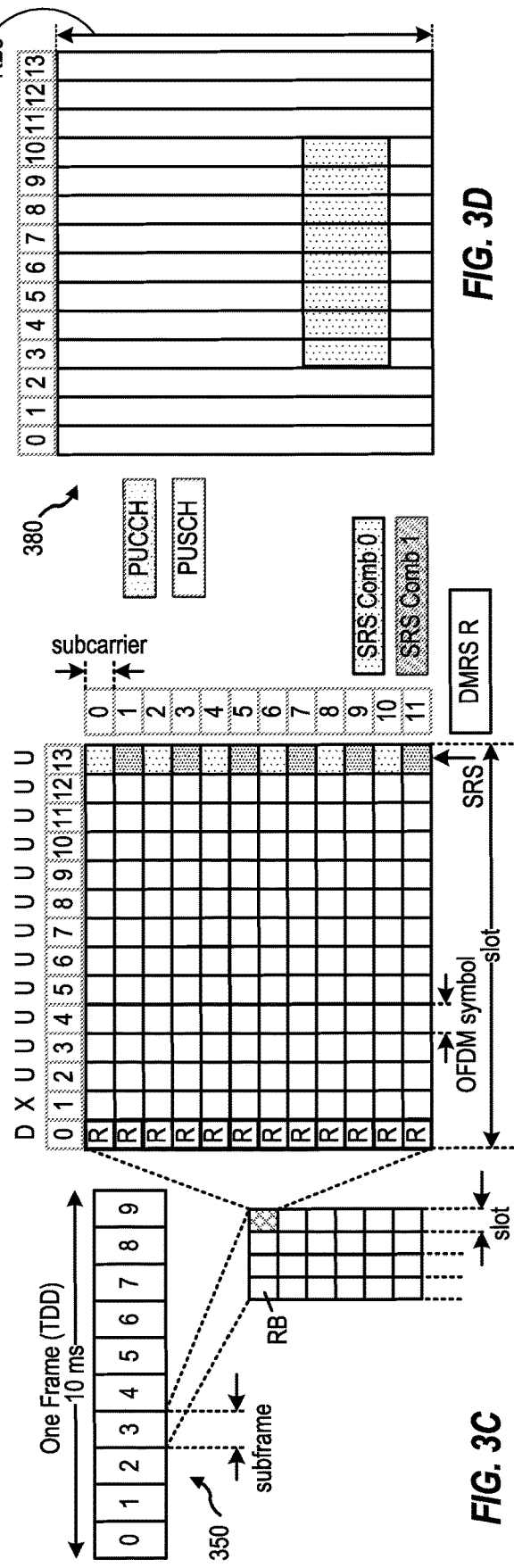

DOWNLINK CONTROL INFORMATION FOR RETRANSMISSION OF SEMI-PERSISTENTLY SCHEDULED PHYSICAL DOWNLINK SHARED CHANNELS

INTRODUCTION

Aspects of the present disclosure relate to wireless communications, and more particularly, to techniques for transmitting downlink control information (DCI) to schedule retransmissions of semi-persistently scheduled (SPS) physical downlink shared channels (PDSCHs) that were not successfully received.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE), the method including receiving a downlink control information (DCI) that schedules retransmission of at least two semi-persistently scheduled (SPS) physical downlink shared channels (PDSCHs) that have hybrid automatic retransmission request (HARQ) identifier (IDs); and receiving the retransmissions of the at least two PDSCHs.

One aspect provides a method for wireless communications by a base station (BS), the method including transmitting a DCI that schedules retransmission of at least two SPS PDSCHs that have HARQ IDs; and transmitting the retransmissions of the at least two PDSCHs.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer readable medium storing computer executable code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Figure 1:
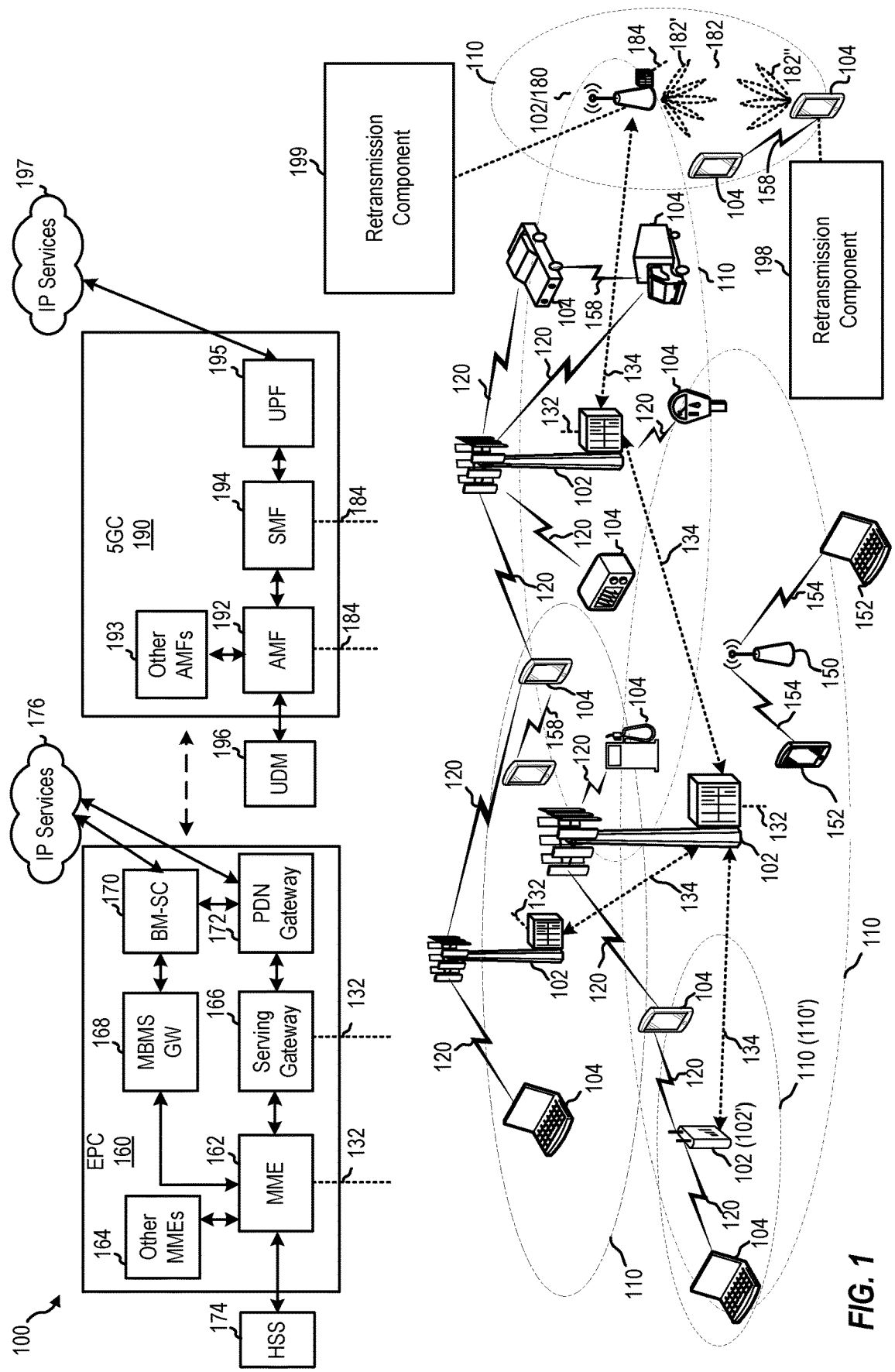
FIG. 1 is a block diagram conceptually illustrating an example wireless communication network.

Aspects of the present disclosure provide apparatuses, methods, processing systems, and computer-readable mediums for transmitting downlink control information (DCI) to schedule retransmissions of semi-persistently scheduled (SPS) physical downlink shared channels (PDSCHs) that were not successfully received.

When a base station (BS) transmits semi-persistently scheduled (SPS) physical downlink shared channels (PD-SCHs) to a user equipment (UE), it is possible for the UE to fail to receive (e.g., fail to detect or fail to decode) more than one of the SPS PDSCHs. The BS may dynamically schedule and retransmit each PDSCH that the UE failed to receive. For the retransmissions, it may be more efficient for the BS to transmit a single downlink control information (DCI) scheduling multiple retransmissions, instead of a DCI to schedule each retransmission. Hybrid automatic retransmission request (HARQ) identifiers (IDs) are assigned to PDSCHs transmitted by the BS to the UE, so that the BS and UE can track the success or failure of each PDSCH. The HARQ IDs may, for example, be in a range from 0 to 15. It is desirable for the BS to indicate the HARQ IDs of the PDSCHs in the DCI, so that the receiving UE can both acknowledge the retransmissions and combine the data from the retransmissions with information the UE obtained from the failed original transmissions.

Previous techniques for including HARQ IDs in a DCI scheduling multiple PDSCHs enable the DCI to indicate a first HARQ ID that corresponds to a first (re)transmitted PDSCH, and then HARQ IDs for the other PDSCHs scheduled by the DCI are assumed to be sequential from the first HARQ ID. In other words, previous techniques enable one DCI scheduling multiple PDSCHs with consecutive HARQ IDs. If two PDSCHs to be scheduled are with non-consecutive HARQ IDs, two separate DCIs are used to schedule those PDSCHs. If the total HARQ IDs supported is 16 and additional PDSCHs are scheduled by a DCI after a PDSCH with an assigned HARQ ID of 15, then HARQ ID "wraps around" and a HARQ ID of 0 is assigned to the next PDSCH. In other words, with a total number of 16 HARQ IDs, HARQ IDs of PDSCHs scheduled by the DCI are assigned sequentially in a circular way and HARQ ID 15 and 0 are consecutive in this sense. Usually, the HARQ IDs of a group of SPS PDSCHs are a subset (e.g., 4, 5, 6, and 7) of the total HARQ IDs 0 to 15. Also, a UE may successfully receive non-consecutive PDSCHs and thus a BS may only need to retransmit failed PDSCHs with non-consecutive HARQ IDs.

So, for retransmissions of SPS PDSCHs, it is desirable for a scheduling DCI to be able to indicate only the HARQ IDs in the subset of HARQ IDs assigned to the SPS PDSCHs and to indicate that some HARQ IDs, which correspond to PDSCHs that were successfully received, are being skipped in the retransmissions. For example, if a BS transmits a group of SPS PDSCHs with HARQ IDs 4, 5, 6, and 7 then it is desirable for the DCI scheduling retransmissions of those SPS PDSCHs to indicate only HARQ IDs from the set [4, 5, 6, 7]. And if the UE successfully receives only some of those PDSCHs, it is desirable for the DCI to indicate some HARQ IDs are skipped or not retransmitted. For example, if the UE receives the PDSCH with HARQ ID 5, then it is desirable for the DCI scheduling the retransmissions to include a first HARQ ID as 4, to indicate that the PDSCH with HARQ ID 5 is being skipped, and also to indicate the DCI schedules 3 PDSCHs to be retransmitted. In the end, only failed PDSCHs with HARQ IDs 4, 6, and 7 are being retransmitted, thus one DCI may schedule all three failed PDSCHs even though their HARQ IDs are not consecutive. And it is desirable for the UE receiving the DCI and the retransmissions to be able to determine the HARQ IDs of the PDSCHs scheduled by the DCI.

Aspects of the present disclosure provide techniques for a DCI scheduling retransmissions of SPS PDSCHs to indicate HARQ IDs selected from the subset of HARQ IDs assigned to the SPS PDSCHs. ABS transmitting the DCI indicates in the DCI the HARQ IDs for the retransmitted PDSCHs, and a UE receiving the DCI determines the HARQ IDs of the retransmitted PDSCHs. In certain aspects of the present disclosure, the BS may indicate that some HARQ IDs of a range indicated in the DCI are skipped, and a UE receiving the DCI determines the HARQ IDs of the retransmitted PDSCHs by skipping the HARQ IDs that were indicated to be skipped in the DCI.

By enabling a DCI for retransmissions of SPS PDSCHs to indicate the subset of HARQ IDs assigned to the SPS PDSCHs and to indicate that some HARQ IDs in a range are being skipped for the retransmissions, communications systems are able to conserve control channels and transmission resources, making the wireless communications more efficient.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes retransmission component 199, which may be configured to transmit retransmissions of at least two SPS PDSCHs. Wireless network 100 further includes retransmission component 198, which may be used configured to receive retransmissions of at least two SPS PDSCHs.

Figure 2:
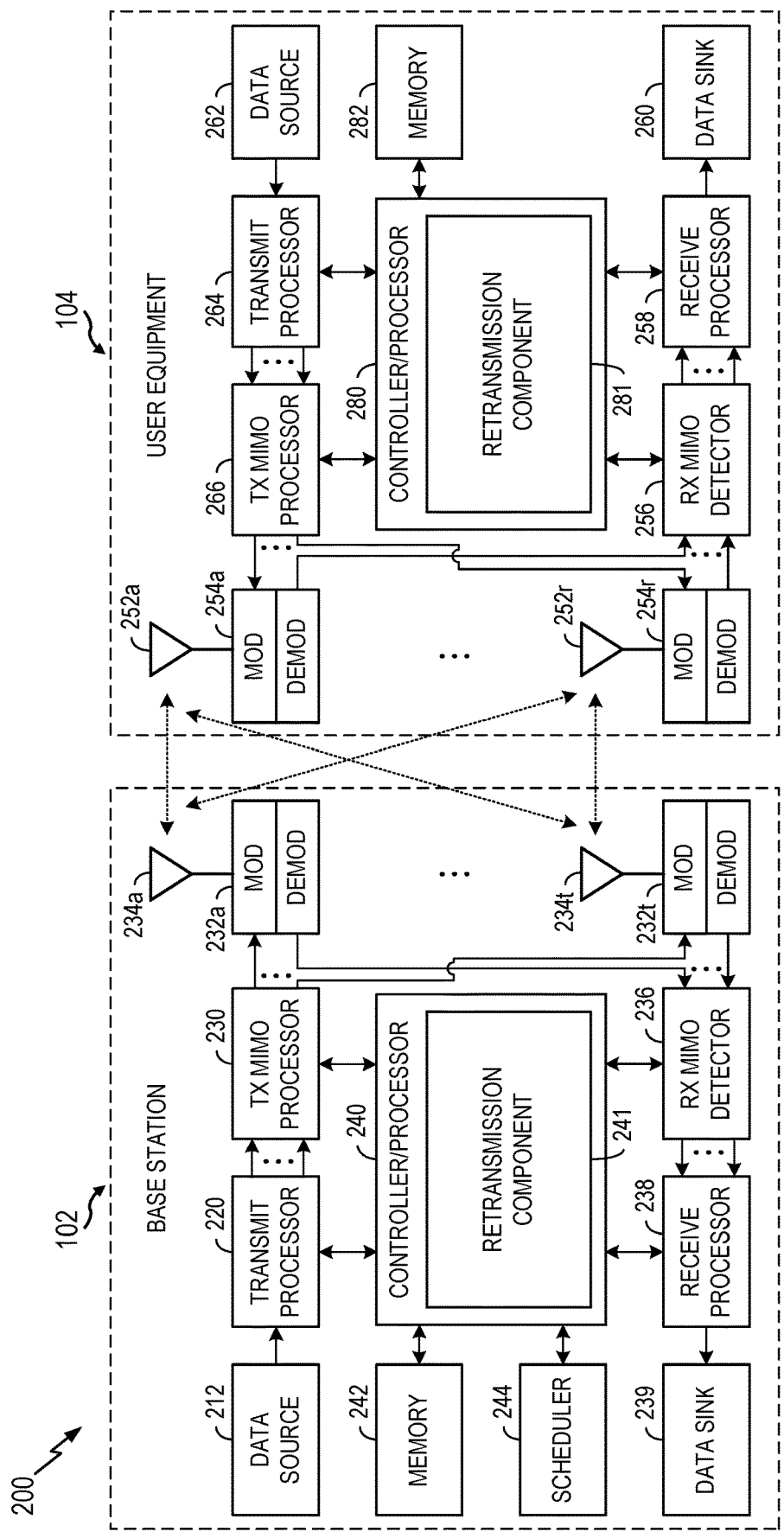
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes retransmission component 241, which may be representative of retransmission component 199 of FIG. 1. Notably, while depicted as an aspect of controller/processor 240, retransmission component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes retransmission component 281, which may be representative of retransmission component 198 of FIG. 1. Notably, while depicted as an aspect of controller/processor 280, retransmission component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, for frequencies in the 71 GHz to 114.25 GHz range, the available band around may be used mostly for fixed use cases, e.g., fixed point to point or fixed point to multi-point. As a result, the NR design in this frequency range may focus more on optimization for low or no mobility use cases with a limited number of clients potentially far away. In other words, coverage may be more important than flexibility or mobility. In such cases, the effective isotropic radiated power (EIRP) limitation can be quite high as well, e.g., up to 85 dBm. The EIRP limitation may be subject to some antenna gain limitation, such as 85 dBm EIRP is only possible if antenna gain exceeds 55 dB. The EIRP limitation for this frequency range is substantially higher than the FR2-2 (52.6 to 71 GHz) band. As a result, narrow beam techniques might be preferred in order to provide coverage in this frequency range.

Figure 4:
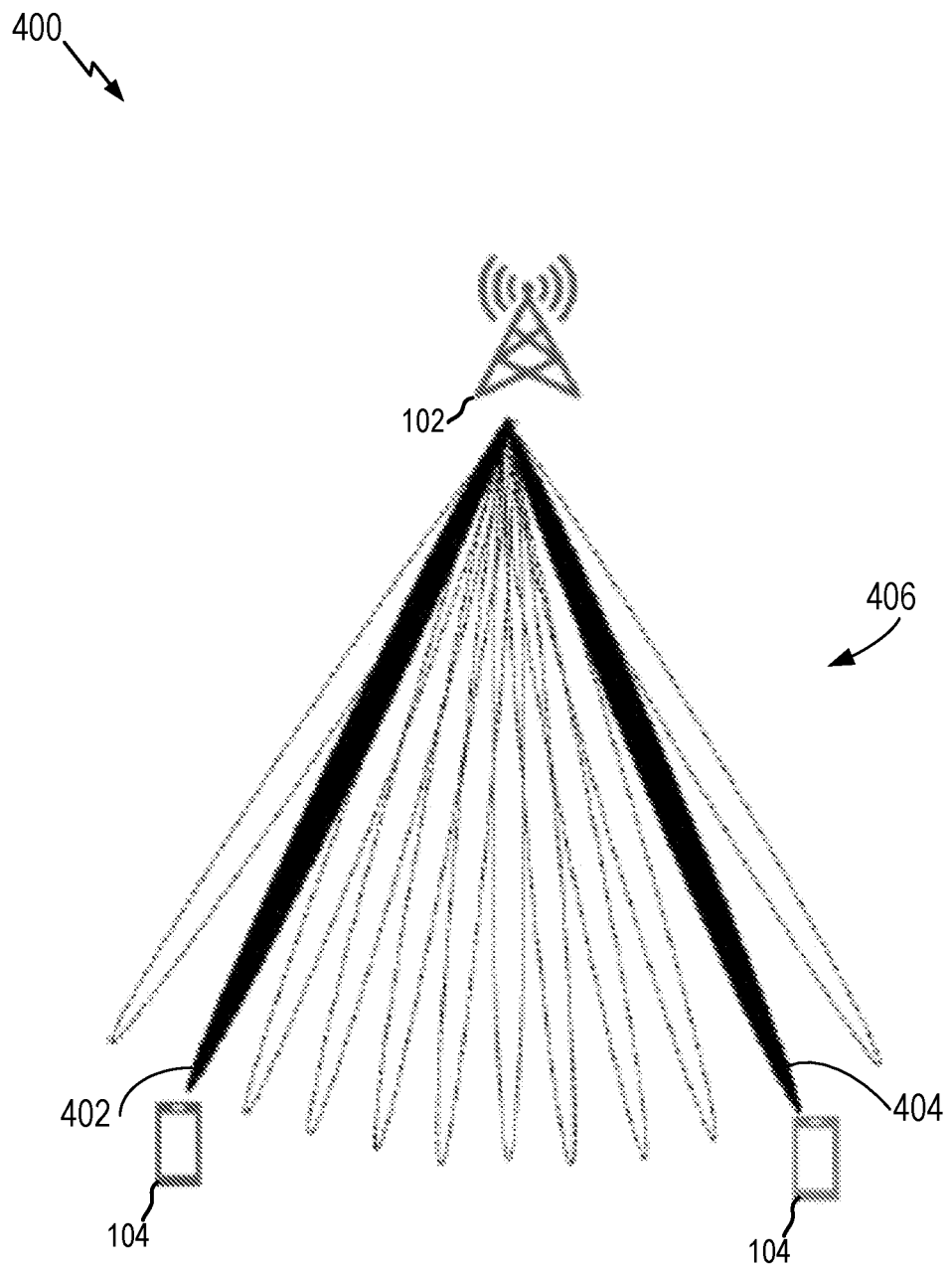
FIG. 4 depicts an example communications system operating in the 71 GHz to 114.25 GHz range.

FIG. 4 depicts an example communications system 400 operating in the 71 GHz to 114.25 GHz range, according to aspects of the present disclosure. The BS 102 communicates with the UEs 104 via narrow beams 402 and 404, which the BS selects from the set of beams 406. Each of the UEs 104 select narrow beams for receiving the signals from the BS.

Overview of SPS PDSCH Transmissions

In Rel-16/17 communications, techniques to schedule multi-PUSCH and multi-PDSCH (also referred to collectively herein as "multi-PXSCH") with a single DCI have been introduced to reduce control overhead. In these techniques, one DCI may be used to schedule multiple PUSCHs or PDSCHs. These multiple PUSCHs or PDSCHs may be transmitted with a same modulation and coding scheme (MCS) or frequency domain resource allocation (FDRA), in order to reduce overhead.

For the 71 GHz to 114.25 GHz frequency range with fixed point or low mobility applications (see, e.g., FIG. 4), the possible higher propagation losses and stable channel conditions make it increasingly desirable to further reduce control overhead and/or increase coverage.

Thus, for multi-PXSCH transmissions, to further reduce overhead, it may be desirable to make these multi-PXSCH transmissions through configured grants (CGs) or semi-persistently scheduling (SPS). A BS (e.g., a gNB) may then activate or deactivate the multi-PUSCH CG or multi-PDSCH SPS. When multi-PDSCH SPS is activated, there may be multiple PDSCH transmissions during each of a set of pre-configured periods without dynamic DCI. When multi-PUSCH CG is activated, there may be multiple PUSCH transmissions for each of a set of pre-configured periods without dynamic DCI. A similar effect might be achievable with multiple single-PUSCH CGs (single-PUSCH CG refers to a CG configuration that may be one PUSCH transmission during each of a set of pre-configured periods without dynamic DCI) or single-PDSCH SPS configurations (single-PDSCH SPS refers to a SPS configuration that may be one PDSCH transmission during each of a set of pre-configured periods without dynamic DCI). But utilizing multiple single-PUSCH CGs or single-PDSCH SPSs may use many RRC configuration messages and may also use many activation DCIs to get the process started. As described herein, a benefit of multi-PXSCH based SPS or CG is saving (i.e., reducing the number) of RRC configuration messages and activation DCIs.

Figure 5:
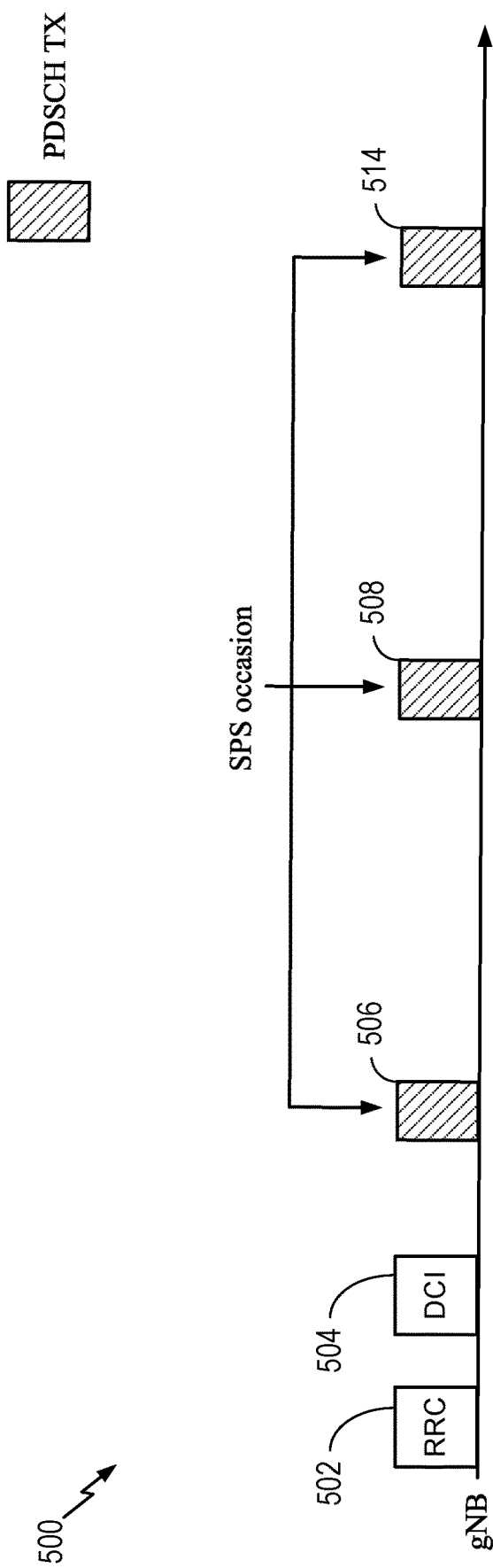
FIG. 5 illustrates an example of semi-persistent scheduled (SPS) physical downlink shared channel (PDSCH) occasions, in accordance with certain aspects of the present disclosure.

FIG. 5 illustrates an example of semi-persistent scheduled (SPS) physical downlink shared channel (PDSCH) occasions, in accordance with certain aspects of the present disclosure. As illustrated in FIG. 5, after a user equipment (UE) is pre-configured with a periodicity, if the SPS configuration is activated, then SPS occasions 506, 508, and 514 may repeat according to the pre-configured periodicity, resulting in periodic SPS PDSCH occasions. For SPS, a BS (e.g., a gNB) may use Radio Resource Control (RRC) signaling 502 to define a subset of parameters, including the periodicity, of the SPS configuration and transmit a DCI 504 which defines the rest of the set of parameters of the SPS and also activates the SPS configuration. Alternatively, a BS may use RRC signaling 502 to define the full set of the parameters of the SPS, and the RRC signaling also activates the SPS (thus DCI 504 is not needed in this case).

As used herein, the term occasion generally refers to a time in which resources are allocated for a transmission that may or may not happen. For example, a DL transmission may or may not occur in an SPS occasion. An occasion may be considered activated when a transmission in the occasion is expected to occur. Accordingly, activated occasions may be monitored.

Figure 6:
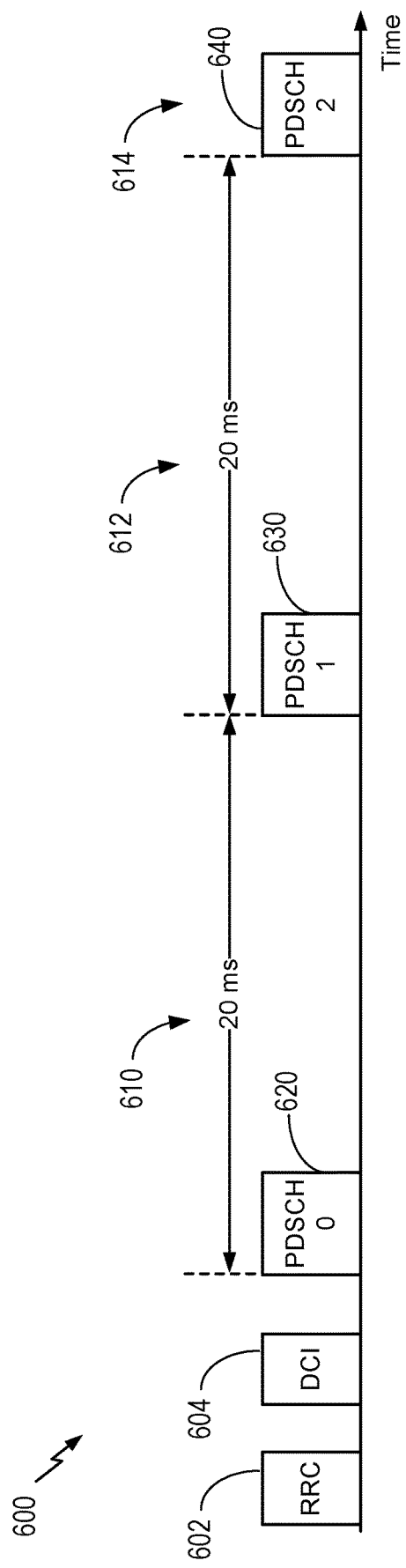
FIG. 6 depicts an example transmission timeline for a semi-persistently scheduled (SPS) single PDSCH technique.

FIG. 6 depicts an example transmission timeline 600 for a semi-persistently scheduled (SPS) single PDSCH technique (referred to as single-PDSCH SPS herein). In transmission timeline 600, the SPS configuration uses a period of 20 ms and has the number of HARQ processes (nrofHARQ-Processes) set as 3 and harq-ProcID-Offset as 0 (thus, HARQ IDs assigned to the SPS are 0, 1, and 2). In transmission timeline 600, a BS (e.g., BS 102, shown in FIGS. 1 & 2) transmits a radio resource control (RRC) configuration 602 with the SPS configuration and a DCI 604 to activate the SPS configuration for a UE (e.g., UE 104, shown in FIGS. 1 & 2). The SPS configuration is for one PDSCH during each period. Then, in each of the periods 610, 612, and 614, the BS transmits one of the PDSCHs 620, 630, and 640. FIG. 6 is an example of type 2 SPS in which a DCI is used to activate the SPS. A similar transmission scheme may be achieved through a type 1 SPS in which an RRC message contains all configuration parameters of a SPS, and the RRC message also activates the SPS.

Aspects Related to Transmitting DCI to Schedule Retransmissions of SPS PDSCHs

Figure 7:
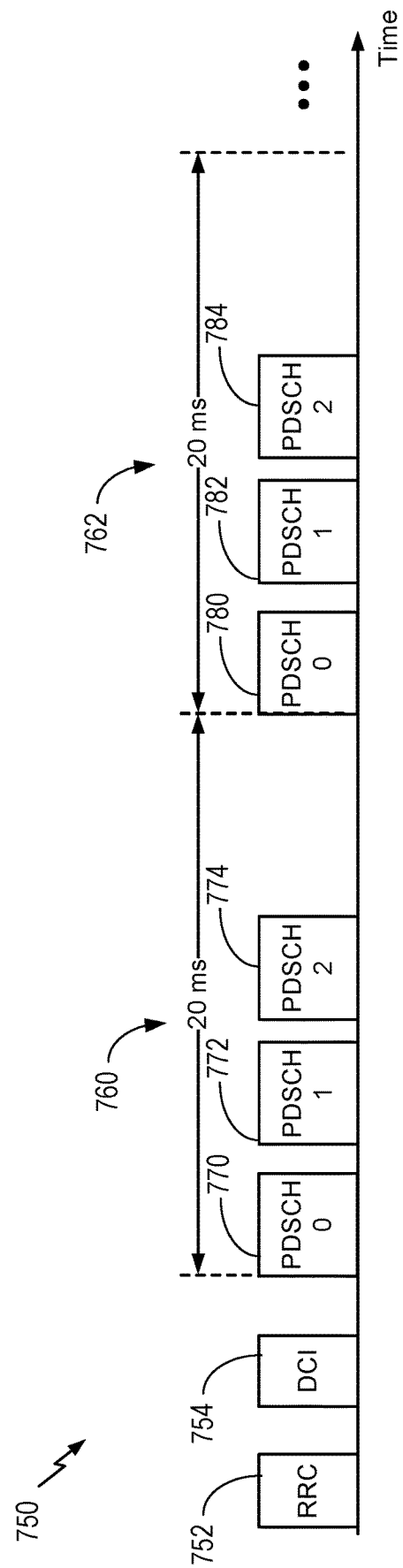
FIG. 7 depicts an example transmission timeline for an SPS multi-PDSCH technique.

FIG. 7 depicts an example transmission timeline 750 for an SPS multi-PDSCH technique (referred to as multi-PDSCH SPS herein). In transmission timeline 750, the SPS configuration uses a period of 20 ms, sets the number of HARQ processes (nrofHARQ-Processes) as 3, and sets harq-ProcID-Offset as 0 (thus, HARQ IDs assigned to the SPS are 0, 1, and 2). In transmission timeline 750, a BS (e.g., BS 102, shown in FIGS. 1 & 2) transmits a radio resource control (RRC) configuration 752 with the SPS configuration (period of 20 ms and the number of HARQ processes set as 3) and a DCI 754 to activate the SPS configuration for a UE (e.g., UE 104, shown in FIGS. 1 & 2). The SPS configuration is for three PDSCHs in each period (these three PDSCHs in each period may be referred to as a PDSCH burst). Then, in each of the periods 760 and 762, the BS may transmit three PDSCHs, e.g., PDSCHs 770, 772, and 774 in period 760 and PDSCHs 780, 782, and 784 in period 762. After the transmission of the PDSCH 774 that is assigned HARQ ID 2, the BS "wraps around" counting of HARQ IDs, so the BS assigns HARQ ID 0 to PDSCH 780. FIG. 7 is an example of type 2 multi-PDSCH SPS in which a DCI is used to activate the SPS. A similar transmission scheme may be achieved through a type 1 multi-PDSCH SPS in which a RRC message contains all configuration parameters of a SPS and the RRC message also activates the SPS.

Rel-17 has introduced multi-PDSCH DCI as a feature. Multi-PDSCH DCIs may have a number of start and length indicator values (SLIVs), M, in the time domain resource allocation (TDRA) entry included in the multi-PDSCH DCI that indicates the number of PDSCHs scheduled by the DCI. Multi-PDSCH DCIs also have M bits of new data indicator (NDI) and redundancy value (RV), respectively, and the bit-length of the NDI and RV fields depends on the longest TDRA entry. All PDSCHs scheduled by the multi-PDSCH DCI use a same FDRA or MCS. Multi-PDSCH DCIs have one HARQ ID field, which indicates the HARQ ID for the first PDSCH of a new transport block (TB) or retransmission (ReTx) scheduled by the multi-PDSCH DCI. HARQ IDs for the rest of the PDSCHs or TBs scheduled by the multi-PDSCH DCI increase by 1 based on the first HARQ ID indicated in the DCI, sequentially. PDSCHs scheduled by a multi-PDSCH DCI thus have consecutive HARQ IDs. HARQ IDs of the PDSCHs scheduled by the multi-PDSCH DCI may "wrap around" after reaching a maximal allowed HARQ ID (e.g., 15) supported by the UE and restart at 0.

In Rel-15 and 16, the total number of HARQ ID processes supported by a UE may be 16, so assignment of HARQ IDs to transmissions wrap around at 16. That is, if a transmission would be assigned a HARQ ID of 16, the transmitter (e.g., a BS) assigns 0 as the next HARQ ID instead of 16. In aspects of the present disclosure, "wrap around" may be considered a modulo operation. For example, for a DCI scheduling a 4-PDSCH burst of which a starting HARQ ID is 14, the HARQ IDs for the 4-PDSCH burst are 14, 15, 0, and 1.

According to aspects of the present disclosure, the HARQ IDs occupied by (e.g., assigned to) a SPS are limited to nrofHARQ-Processes IDs starting with harq-ProcID-Offset, i.e., the set [harq-ProcID-Offset, . . . , harq-ProcID-Offset+nrofHARQ-Processes−1]. For a multi-PDSCH SPS, the number of PDSCHs transmitted per burst may be smaller than nrofHARQ-Processes, which may be determined by the size of valid SLIVs in the (partial) activation DCI for the SPS configuration.

In aspects of the present disclosure, a retransmission (ReTx) for a single PDSCH that was first transmitted via semi-persistently scheduled resources is scheduled via a DCI whose cyclic redundancy check (CRC) is scrambled by a configured scheduling radio network temporary identifier (CS-RNTI) of the intended recipient (e.g., a UE, such as UE 104, shown in FIGS. 1 & 2). The NDI field in the DCI is set to 1 to indicate to the intended recipient that the PDSCH scheduled by the DCI is a retransmission of a previously transmitted PDSCH, and the HARQ ID field in the DCI indicates which PDSCH to be retransmitted.

According to aspects of the present disclosure, retransmissions for multiple PDSCHs that were first transmitted via resources configured for one SPS may be scheduled by a multi-PDSCH DCI. The multi-PDSCH DCI may have a cyclic redundancy check (CRC) that is scrambled by the CS-RNTI of the intended recipient, and the HARQ ID indicated in the multi-PDSCH DCI may be some of the HARQ IDs of the PDSCHs transmitted via the SPS resources, e.g., HARQ IDs selected from the set [harq-ProcID-Offset, . . . , harq-ProcID-Offset+nrofHARQ-Processes−1], discussed herein. Based on the HARQ ID included in the DCI, a UE may determine the corresponding SPS of which some PDSCHs are to be scheduled by the DCI and to be retransmitted.

Aspects of the present disclosure provide techniques for determining the HARQ IDs in a DCI scheduling multiple retransmissions of failed PDSCHs first transmitted via resources configured for one SPS.

Figure 8:
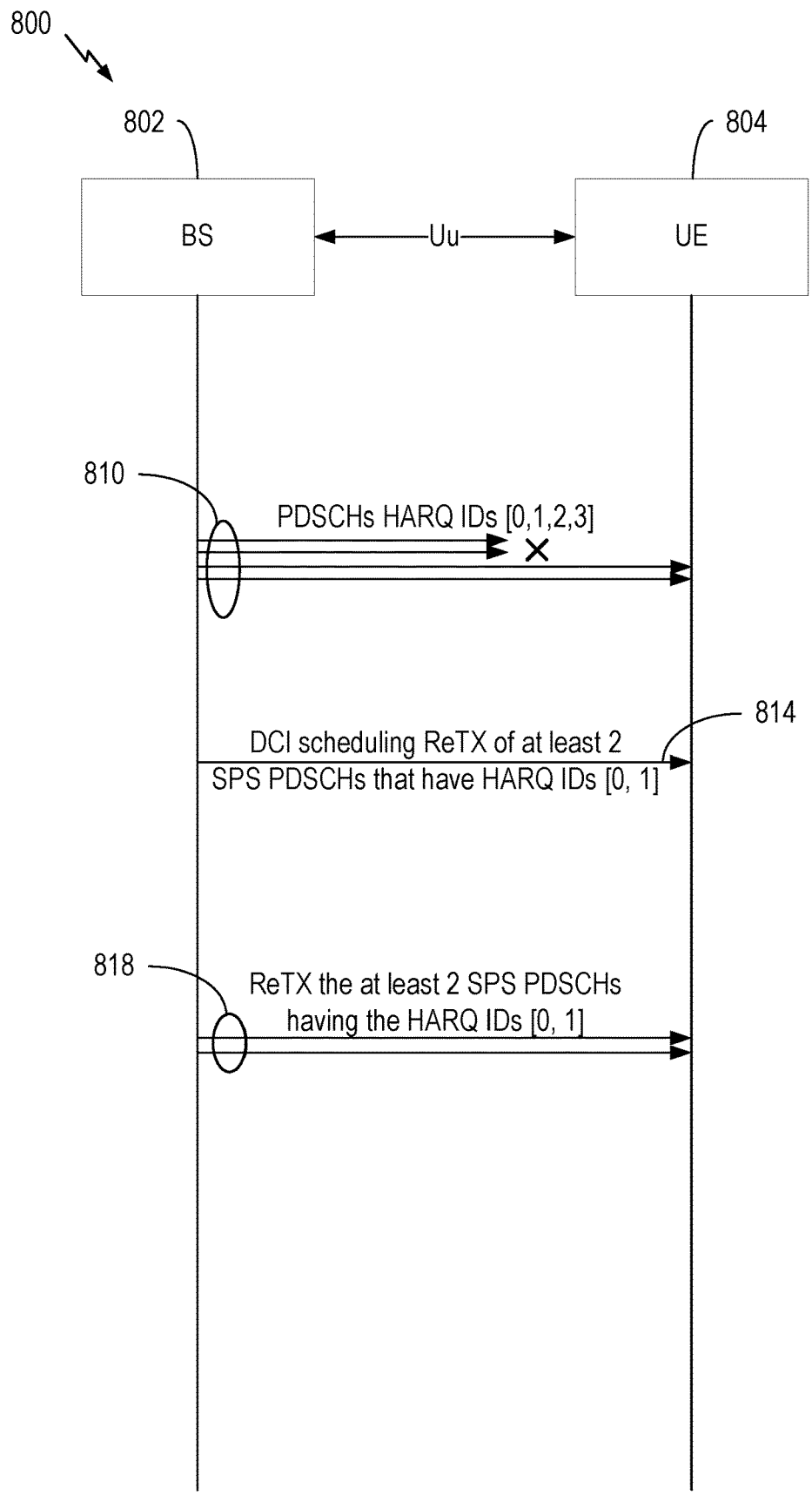
FIG. 8 depicts an example call flow for a BS retransmitting multiple consecutive SPS PDSCHs to a UE.

FIG. 8 depicts an example call flow 800 for a BS 802 retransmitting multiple SPS PDSCHs to a UE 804. The BS and UE are wirelessly communicating via a Uu interface. In the example call flow 800, the BS transmits PDSCHs with HARQ IDs 0, 1, 2, and 3 at 810, but the UE does not receive all of those PDSCHs and may fail to receive PDSCHs with HARQ IDs 0 and 1. Upon receiving NACKs (which are not shown in FIG. 8) for HARQ IDs 0 and 1, the BS transmits and the UE receives a multi-PDSCH DCI scheduling retransmission of at least 2 SPS PDSCHs that have HARQ IDs (e.g., HARQ IDs 0 and 1) at 814. The BS retransmits and the UE receives the PDSCHs at 818.

In aspects of the present disclosure, through some RRC message or some other messages configuration, when a DCI is used to schedule multiple retransmissions for a multi-PDSCH SPS, these HARQ IDs assigned to PDSCHs to be scheduled by the DCI may wrap around at nrofHARQ-Processes+harq-ProcID-Offset, instead of 16, wherein nrofHARQ-Processes and harq-ProcID-Offset are parameters configured for the SPS. In other words, when it is configured through RRC or some other message, a UE may first determine the corresponding multi-PDSCH SPS based on the HARQ ID field indicated in the DCI, and then determine that HARQ IDs assigned to PDSCHs to be scheduled by the DCI may wrap around at nrofHARQ-Processes+harq-ProcID-Offset, instead of 16.

According to aspects of the present disclosure, through some RRC message or some other messages configuration, when a DCI is used to schedule multiple retransmissions for a multi-PDSCH SPS, after HARQ IDs wrap around, then assignment of HARQ IDs may restart at harq-ProcID-Offset, instead of 0. In other words, when it is configured through RRC or some other message, a UE may first determine the corresponding multi-PDSCH SPS based on the HARQ ID field indicated in the DCI. The UE may further determine that HARQ IDs assigned to PDSCHs being scheduled by the DCI may wrap around at nrofHARQ-Processes+harq-ProcID-Offset, and assignment of HARQ IDs may restart at harq-ProcID-Offset after wrap around.

Figure 9:
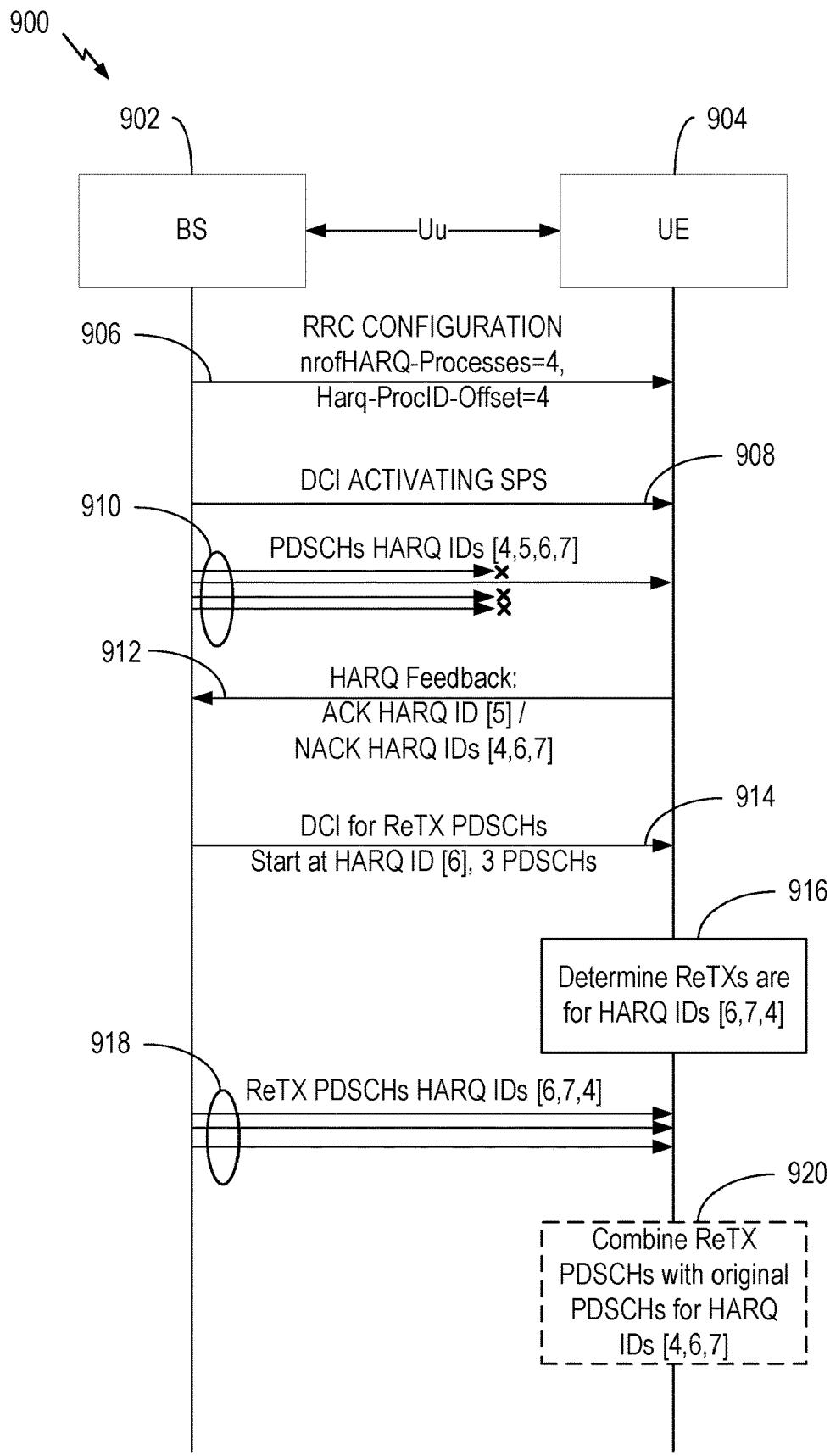
FIG. 9 depicts an example call flow for a BS retransmitting SPS PDSCHs to a UE and wrapping around assigning of HARQ IDs for the retransmissions.

FIG. 9 depicts an example call flow 900 for a BS 902 transmitting multiple SPS PDSCHs to a UE 904 and retransmitting some of the PDSCHs. The BS and UE are wirelessly communicating via a Uu interface. In the example call flow 900, the BS transmits a radio resource control (RRC) configuration of the SPS with nrofHARQ-Processes=4 and harq-ProcID-Offset=4 at 906. The BS then transmits a DCI activating the SPS at 908. The BS may further configure, through some RRC message, that if a DCI schedules multiple retransmission for SPS, the HARQ ID in the DCI wraps around at nrofHARQ-Processes+harq-ProcID-Offset and restarts at harq-ProcID-Offset after wrap around, where nrofHARQ-Processes and harq-ProcID-Offset are parameters configured for the SPS identified by the HARQ ID included in the DCI. At 910, the BS transmits 4 PDSCHs that are assigned the HARQ IDs 4, 5, 6, and 7, respectively. The UE does not receive 3 out of the 4 PDSCHs (with HARQ IDs 4, 6, and 7 in the example), and transmits negative acknowledgments (NACKs) for the 3 PDSCHs at 912. The BS then transmits a multi-PDSCH DCI scheduling retransmission of the 3 PDSCHs at 914. The DCI indicates the first HARQ ID is 6 and schedules three PDSCHs. Based on the first HARQ ID indicated in the DCI being 6 and the DCI scheduling 3 PDSCHs, the UE determines (e.g., calculates) the HARQ IDs for the 3-PDSCH burst are 6, 7, and 4 at 916. The BS retransmits the PDSCHs at 918. At 920, the UE optionally combines the retransmitted PDSCHs with data (if any) that the UE retained from the failed reception of the original PDSCHs at 910.

By wrapping around HARQ IDs when the next HARQ ID equals (nrofHARQ-Processes+harq-ProcID-Offset) instead of 16, the HARQ IDs indicated in a DCI scheduling multiple retransmissions for a multi-PDSCH SPS are limited to those HARQ IDs used by the SPS. In FIG. 9, with RRC configuration and HARQ IDs wrapping around at nrofHARQ-Processes+harq-ProcID-Offset and restarting at harq-ProcID-Offset, one DCI may schedule all three failed PDSCHs even though their HARQ IDs (6, 7, and 4 in the example) are not consecutive.

In aspects of the present disclosure, a UE may determine (e.g., based on a flag or other information in a DCI, SPS configuration, RRC messages, or some other messages) whether assignment of HARQ IDs within a DCI wraps around at 16 (e.g., legacy behavior) or at some other value as described herein, when the DCI is used to scheduled multiple retransmissions of PDSCHs first transmitted through some SPS resources.

Another example of wrapping around HARQ IDs at values determined based on HARQ IDs assigned to one SPS may be described as follows. In an example, a BS may transmit a multi-PDSCH SPS with the SPS configuration including nrofHARQ-Processes=6 and harq-ProcID-Offset=4. Thus, the HARQ IDs of the PDSCHs transmitted in a period of the SPS are selected from the set [4, 5, 6, 7, 8, 9]. In the example, the UE fails to receive the PDSCHs having HARQ IDs 4, 5, and 9. With currently known techniques for transmitting multi-PDSCH DCIs, a single DCI is unable to schedule retransmissions of the PDSCHs having HARQ IDs 4, 5, and 9, as the IDs are not consecutive. Instead, with currently known techniques, a BS may transmit one DCI to schedule retransmissions for the PDSCHs having HARQ IDs 4 and 5 and a second DCI to schedule retransmission for the PDSCH having HARQ ID 9. However, for a DCI scheduling multiple retransmissions for a multi-PDSCH SPS, with RRC or some other message configuration, the HARQ ID wrap around may occur at harq-ProcID-Offset+nrofHARQ-Processes (which is 10 as described herein) instead of 16, and after wrap around, the HARQ ID may restart assignment of HARQ IDs with harq-ProcID-Offset (which is 4 as described herein) instead of 0, then the above described failed PDSCHs with HARQ IDs 4, 5, and 9 may be scheduled for retransmission with one DCI. The one DCI may indicate that the first HARQ ID is 9, and that three PDSCHs are transmitted. Based on the first HARQ ID value 9, a UE may determine the corresponding SPS (and its harq-ProcID-Offset and nrofHARQ-Processes). Further based on the RRC configuration, UE may determine that HARQ IDs of PDSCHs scheduled by this DCI wrap around occurs at harq-ProcID-Offset+nrofHARQ-Processes of the SPS and restart at harq-ProcID-Offset of the SPS. Since the first PDSCH will have HARQ ID 9, the second PDSCH will have HARQ ID equal to (first HARQ ID+1) mod (harq-ProcID-Offset+nrofHARQ-Processes)+harq-ProcID-Offset. Substituting first HARQ ID=9, harq-ProcID-Offset=4, and nrofHARQ-Processes=6 results in the second PDSCH having HARQ ID=(9+1) mod (6+4)+4=4. The third PDSCH will then have HARQ 4+1=5, and the single DCI will have scheduled PDSCHs having HARQ IDs 4, 5, and 9.

According to aspects of the present disclosure, by using one DCI for scheduling the retransmissions of the PDSCHs instead of two, control overhead (e.g., transmission resources for control channels) is saved, and delays in scheduling the retransmissions may be reduced.

In aspects of the present disclosure, it can be shown that, for a DCI scheduling ReTx for multiple PDSCHs which were first scheduled by some multi-PDSCH SPS, even with wrap around of HARQ ID assignments occurring at (harq-ProcID-Offset+nrofHARQ-Processes) and after the wrap around restarting HARQ ID assignment at harq-ProcID-Offset, one DCI may not be able to schedule all failed PDSCHs of a multi-PDSCH SPS in some cases. For example, a BS may transmit a multi-PDSCH SPS with HARQ IDs [4, 5, 6, 7, 8] assigned to the PDSCHs, (e.g., nrofHARQ-Processes=5 and harq-ProcID-Offset=4). In the example, the UE does not receive the PDSCHs having HARQ IDs 5, 7, and 8. With previously known techniques for scheduling the retransmitted PDSCHs, a BS would have to use two DCIs to schedule the retransmission of the PDSCHs, one DCI for HARQ ID 5 and one DCI for HARQ IDs 7 and 8. Even if wrap around of HARQ ID assignments occurring at (harq-ProcID-Offset+nrofHARQ-Processes) (in this case it is 9) and after the wrap around restarting HARQ ID assignments at harq-ProcID-Offset (in this case it is 4), one DCI may not be able to schedule all failed PDSCHs.

According to aspects of the present disclosure, a DCI scheduling multiple retransmissions of SPS PDSCHs may indicate some HARQ IDs are to be skipped in assigning HARQ IDs to the retransmitted PDSCHs. In these aspects, the PDSCHs that are assigned the skipped HARQ IDs are then not scheduled in the DCI nor retransmitted.

Figure 10:
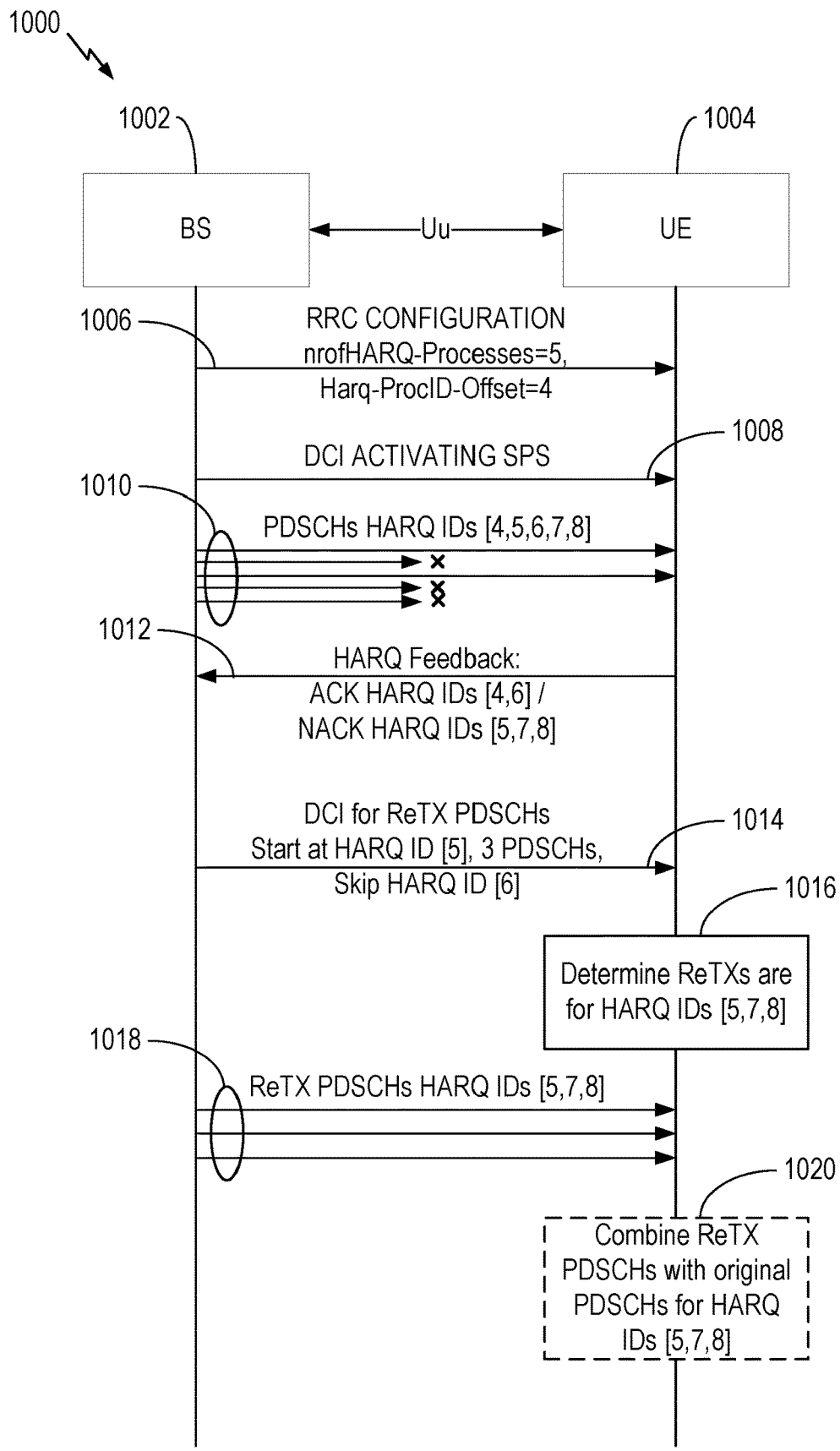
FIG. 10 depicts an example call flow for a BS retransmitting SPS PDSCHs to a UE and skipping assigning of some HARQ IDs for the retransmissions.

FIG. 10 depicts an example call flow 1000 for a BS 1002 transmitting multiple SPS PDSCHs to a UE 1004 and retransmitting some of the PDSCHs. The BS and UE are wirelessly communicating via a Uu interface. In the example call flow 1000, the BS transmits a radio resource control (RRC) configuration of the SPS with nrofHARQ-Processes=5 and harq-ProcID-Offset=4 at 1006. The BS then transmits a DCI activating the SPS at 1008. At 1010, the BS transmits 5 PDSCHs that are assigned the HARQ IDs 4, 5, 6, 7, and 8, respectively. The UE does not receive the 3 PDSCHs having HARQ IDs 5, 7, and 8. At 1012, the UE transmits HARQ feedback that includes ACKs for the PDSCHs assigned HARQ IDs 4 and 6 and negative acknowledgments (NACKs) for the 3 PDSCHs assigned HARQ IDs 5, 7, and 8. The BS then transmits a multi-PDSCH DCI scheduling retransmission of the 3 PDSCHs at 1014. The DCI indicates the first HARQ ID is 5, that HARQ ID 6 is skipped, and schedules 3 PDSCHs. Based on the first HARQ ID indicated in the DCI being 5, HARQ ID 6 being skipped, and the DCI scheduling 3 PDSCHs, the UE at 1016 determines the HARQ IDs for the 3-PDSCH burst are 5, 7, and 8. The BS retransmits the PDSCHs at 1018. At 1020, the UE optionally combines the retransmitted PDSCHs with data (if any) that the UE retained from the failed reception of the original PDSCHs at 1010.

In aspects of the present disclosure, a HARQ ID field in a multi-PDSCH DCI scheduling multiple retransmissions of SPS PDSCHs may be set equal to the HARQ ID of the first PDSCH to be retransmitted, and an NDI field in the DCI may be interpreted (e.g., by a receiving UE) as indicating HARQ IDs, in a sequence of HARQ IDs, that are skipped (e.g., assigned to PDSCHs that are not being retransmitted).

According to aspects of the present disclosure, an NDI field in a multi-PDSCH DCI scheduling retransmissions of SPS PDSCHs may be a bitmap, wherein a first value "1" indicates (e.g., to a receiving UE) that a PDSCH to which a corresponding HARQ ID is assigned is being retransmitted, and a second value "0" indicates that a PDSCH to which a corresponding HARQ ID is being skipped (i.e., not retransmitted).

In aspects of the present disclosure, a bitmap in an NDI field in a multi-PDSCH DCI scheduling retransmissions of SPS PDSCHs may be cross checked with a HARQ ID field of the DCI to ensure the DCI was successfully received and decoded.

According to aspects of the present disclosure, an NDI field in a multi-PXSCH DCI scheduling retransmissions of SPS PDSCHs that is all "0" may indicate activation of a CG or SPS.

In aspects of the present disclosure, when a PDSCH is indicated as being skipped by an NDI field in a multi-PDSCH DCI scheduling retransmissions of SPS PDSCHs, then a SLIV corresponding to the skipped PDSCH may also be skipped in the DCI, if the TDRA entry has enough SLIVs for both skipped PDSCHs and retransmitted PDSCHs.

According to aspects of the present disclosure, when a PDSCH is indicated as being skipped by an NDI field in a multi-PDSCH DCI scheduling retransmissions of SPS PDSCHs, then a SLIV corresponding to the skipped PDSCH may also be skipped in the DCI, and the BS may leave a slot level gap (e.g., leave some resources unused for transmission) for the skipped PDSCH, if the TDRA entry has enough SLIVs for both skipped PDSCHs and retransmitted PDSCHs.

In aspects of the present disclosure, when a PDSCH is indicated as being skipped by an NDI field in a multi-PDSCH DCI scheduling retransmissions of SPS PDSCHs, then a SLIV corresponding to the skipped PDSCH may be mapped to a next scheduled PDSCH to be retransmitted. In certain aspects, the first N SLIVs of the DCI may be matched to the PDSCHs to be retransmitted, where N is the number of PDSCHs to be retransmitted.

According to aspects of the present disclosure, one DCI may be used to schedule PDSCH retransmissions for one or multiple SPS configurations. That is, in some aspects, a DCI may be used to schedule PDSCH retransmissions corresponding to PDSCHs originally transmitted via more than one set of SPS resources.

In aspects of the present disclosure, a multi-PDSCH DCI may schedule retransmission of PDSCHs for one multi-PDSCH SPS or multiple SPSs.

According to aspects of the present disclosure, a UE may determine the HARQ IDs of the PDSCHs being retransmitted based on an RRC flag configured by the BS. The flag may be named, for example, SPSRetxHARQIDWrapAround. In certain aspects, a first value "0" for the flag indicates legacy behavior, e.g., wrap around assignment of HARQ IDs at 16 and restart at 0. In certain aspects, a second value "1" for the flag indicates per SPS configuration based assignment of HARQ IDs, e.g., wrap around assignment of HARQ IDs within a range allowed for the SPS configuration to which the first HARQ ID indicated by the DCI is assigned, as described herein. In certain aspects, a third value "2" for the flag indicates assignment of HARQ IDs using all of the active SPS configurations of the UE, e.g., wrap around assignment of HARQ IDs within a combination of the ranges allowed for all of the active SPS configurations of the UE. In certain aspects, not all of the HARQ IDs, 0-15, are assigned to active SPS configurations.

For example, a UE may be configured with a first SPS configuration, SPS0, that uses HARQ IDs from the set [0,1,2,3], a second SPS configuration SPS1, that uses HARQ IDs from the set [4,5,6,7], and a third SPS configuration, SPS2, that uses HARQ IDs from the set [8,9,10,11]. In the example, a BS transmits a CS-RNTI scrambled multi-PDSCH DCI that has the first HARQ ID set to 3 and schedules 2 PDSCHs for retransmission. As HARQ ID 3 is assigned to SPS0, a UE may determine the HARQ IDs for the rest of the PDSCHs based on the value of parameter SP SRetxHARQIDWrapAround. In certain aspects, when the flag (e.g., SP SRetxHARQIDWrapAround) is 0 or 2, the UE may determine the HARQ IDs of the PDSCHs being retransmitted as 3 and 4. Still in the example, when the flag is 1, then the UE may determine the HARQ IDs of the PDSCHs being retransmitted as 3 and 0.

In some aspects of the present disclosure, a BS may transmit an RRC configuration indicating that some SPS configurations are grouped into SPS groups, and each SPS configuration (and the HARQ IDs assigned in that SPS configuration) may only be assigned into one such SPS group. In these aspects, HARQ ID wrap around and restart behavior may be within the range allowed for each SPS group. That is, a BS may transmit a multi-PDSCH DCI scheduling retransmissions of SPS PDSCHs with the HARQ IDs indicated in the DCI according to the grouping of the SPS configurations into SPS groups. Similarly, a UE receiving a multi-PDSCH DCI scheduling retransmissions of SPS PDSCHs may determine the HARQ IDs indicated in the DCI according to the grouping of the SPS configurations into SPS groups.

According to aspects of the present disclosure, two SPS configurations may be in assigned to a same SPS group when the two SPS configurations have similar MCS requirements for retransmission.

For example, a UE may be configured with a first SPS configuration, SPS0, that uses HARQ IDs from the set [0, 1, 2, 3], a second SPS configuration, SPS1, that uses HARQ IDs from the set [4, 5, 6, 7], and a third SPS configuration, SPS2, that uses HARQ IDs from the set [8, 9, 10, 11]. In the example, a BS transmits a CS-RNTI scrambled multi-PDSCH DCI that has the first HARQ ID set to 3 and schedules 2 PDSCH for retransmission. As HARQ ID 3 is assigned to SPS0, HARQ IDs allowed for the DCI are those IDs of the SPS group that SPS0 belongs to. In certain aspects, if SPS0 is the only SPS configuration of an SPS group, then the DCI schedules PDSCHs to which HARQ IDs 3 and 0 are assigned, and a UE receiving the DCI may determine that the DCI schedules PDSCHs to which HARQ IDs 3 and 0 are assigned. Still in the example, if SPS0 and SPS1 are in a same SPS group, then the DCI schedules PDSCHs to which HARQ IDs 3 and 4 are assigned, and a UE receiving the DCI may determine that the DCI schedules PDSCHs to which HARQ IDs 3 and 4 are assigned. Still in the example, if SPS0 and SPS2 are in a same SPS group, then the DCI schedules PDSCHs to which HARQ IDs 3 and 8 are assigned, and a UE receiving the DCI may determine that the DCI schedules PDSCHs to which HARQ IDs 3 and 8 are assigned.

In another example using the same SPS configurations SPS0, SPS1, and SPS2 described above, a BS transmits a CS-RNTI scrambled multi-PDSCH DCI that has the first HARQ ID set to 10 and schedules 3 PDSCHs for retransmission. As HARQ ID 10 is assigned to SPS2, HARQ IDs allowed for the DCI are those IDs of the SPS group that SPS2 belongs to. In this example, if SPS2 is the only SPS configuration of an SPS group, then the DCI schedules PDSCHs to which HARQ IDs 10, 11, and 8 are assigned (i.e., the HARQ IDs wrap around within the HARQ IDs assigned to SPS2), and a UE receiving the DCI may determine that the DCI schedules PDSCHs to which HARQ IDs 10, 11, and 8 are assigned. Still in this example, if SPS2 and SPS0 are in a same SPS group, then the DCI schedules PDSCHs to which HARQ IDs 10, 11, and 0 are assigned (i.e., the HARQ IDs wrap around within the HARQ IDs assigned to SPS0 and SPS2), and a UE receiving the DCI may determine that the DCI schedules PDSCHs to which HARQ IDs 10, 11, and 0 are assigned. Finally, still in this example, if SPS2 and SPS1 are in a same SPS group, then the DCI schedules PDSCHs to which HARQ IDs 10, 11, and 4 are assigned (i.e., the HARQ IDs wrap around within the HARQ IDs assigned to SPS1 and SPS2), and a UE receiving the DCI may determine that the DCI schedules PDSCHs to which HARQ IDs 10, 11, and 4 are assigned.

Example Methods

Figure 11:
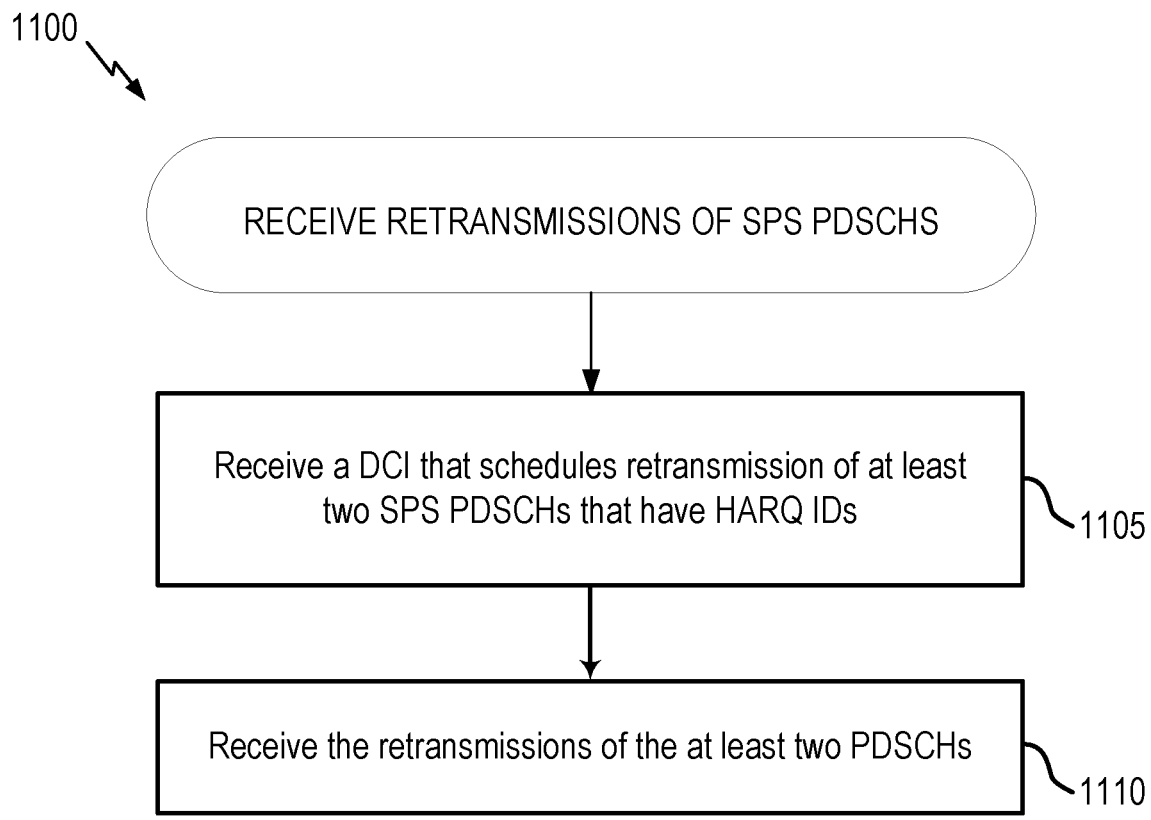
FIGS. 11 and 12 depict example processes for wireless communication according to aspects of the present disclosure.

FIG. 11 shows an example of a method 1100 for wireless communication according to aspects of the present disclosure. In some aspects, a user equipment, such as UE 104 of FIGS. 1 and 2, or processing system 1305 of FIG. 13, may perform the method 1100.

At operation 1105, the system receives a DCI that schedules retransmission of at least two SPS PDSCHs that have HARQ IDs. In some cases, the operations of this step refer to, or may be performed by, DCI circuitry as described with reference to FIG. 13.

At operation 1110, the system receives the retransmissions of the at least two PDSCHs. In some cases, the operations of this step refer to, or may be performed by, PDSCH circuitry as described with reference to FIG. 13.

In some aspects, receiving the retransmissions comprises combining the retransmitted PDSCHs with previously received PDSCHs having same HARQ IDs.

In some aspects, the method 1100 further includes transmitting one or more ACKs or NACKs in response to receiving the PDSCHs, wherein the ACKs or NACKs indicate the HARQ IDs of the PDSCHs.

In some aspects, the method 1100 further includes determining, based at least in part on information in the DCI, a HARQ ID corresponding to each of the at least two PDSCHs.

In some aspects, determining the HARQ ID corresponding to each of the at least two PDSCHs comprises: determining a first HARQ ID based on a value of a HARQ ID field in the DCI, wherein the first HARQ ID corresponds to the first PDSCH of the at least two PDSCHs; and determining the HARQ ID corresponding to each of the at least two PDSCHs, other than the first PDSCH, based on the first HARQ ID, a set of HARQ IDs allowed for the DCI, a HARQ process ID offset, and one or more configurations of one or more SPSs.

In some aspects, determining the HARQ ID corresponding to each of the at least two PDSCHs further comprises: receiving a RRC configuration parameter indicating a set of HARQ IDs, allowed for the DCI and corresponding to each of the at least two PDSCHs, belongs to a single SPS; and calculating a HARQ ID corresponding to a PDSCH after the first PDSCH of the at least two PDSCHs as: reviousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

In some aspects, determining the HARQ ID corresponding to each of the at least two PDSCHs is further based on a number of HARQ IDs to be skipped indicated in the DCI.

In some aspects, the method 1100 further includes determining, based on a NDI bitmap in the DCI, one or more HARQ IDs to be skipped, determining the number of HARQ IDs to be skipped based on the NDI bitmap, and determining a SLIV for each of the at least two PDSCHs based at least in part on the one or more HARQ IDs to be skipped.

In some aspects, the method 1100 further includes receiving a RRC configuration parameter indicating a set of SPSs allowed for the DCI and determining the set of HARQ IDs allowed for the DCI and the HARQ process ID offset based at least in part on a number of SPSs in the set of SPSs allowed for the DCI and the first HARQ ID.

In some aspects, the method 1100 further includes receiving RRC signaling assigning each SPS to a group, determining a group of SPSs based at least in part on the first HARQ ID, and determining the set of HARQ IDs allowed for the DCI and the HARQ process ID offset based at least in part on the determined group of SPSs.

Figure 12:
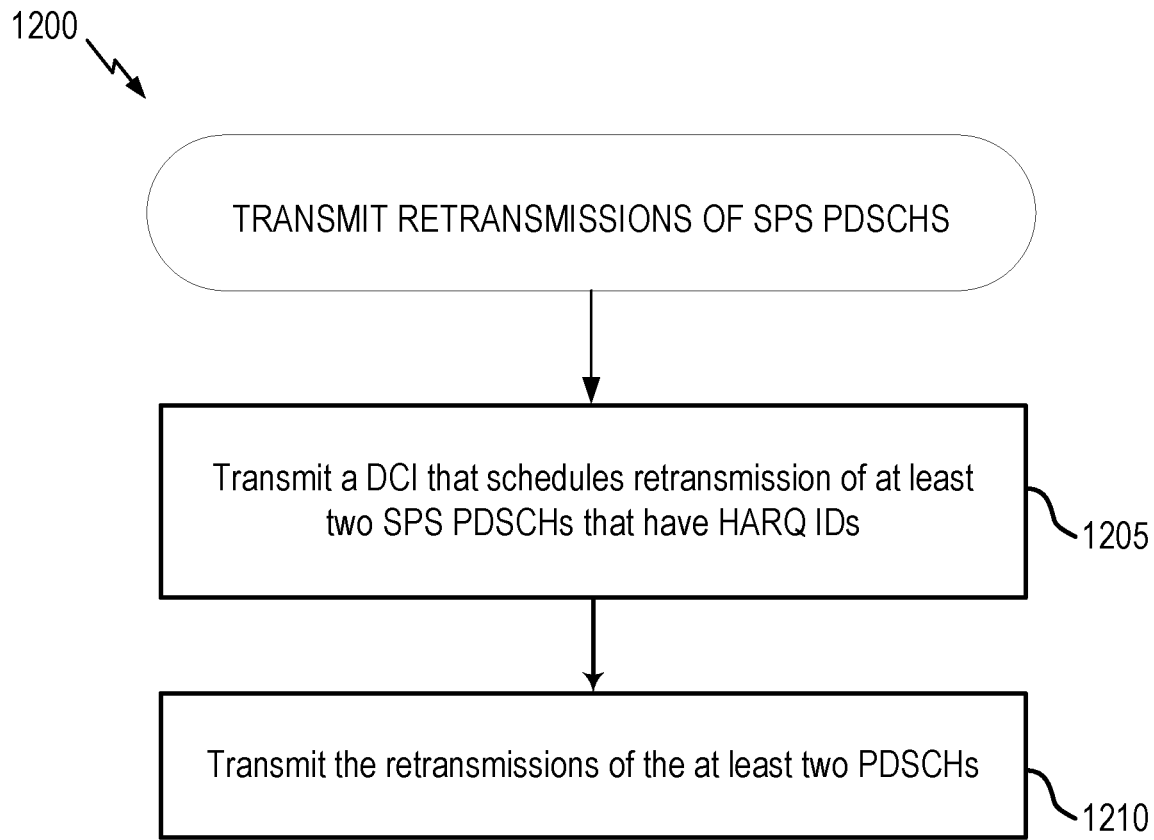

FIG. 12 shows an example of a method 1200 for wireless communication according to aspects of the present disclosure. In some aspects, a base station, such as BS 102 of FIGS. 1 and 2, or processing system 1405 of FIG. 14, may perform the method 1200.

At operation 1205, the system transmits a DCI that schedules retransmission of at least two SPS PDSCHs that have HARQ IDs. In some cases, the operations of this step refer to, or may be performed by, UE DCI circuitry as described with reference to FIG. 14.

At operation 1210, the system transmits the retransmissions of the at least two PDSCHs. In some cases, the operations of this step refer to, or may be performed by, PDSCH retransmission circuitry as described with reference to FIG. 14.

In some aspects, transmitting the retransmissions of the at least two PDSCHs comprises transmitting RVs of the PDSCHs that are different from RVs of original transmissions of the PDSCHs.

In some aspects, the method 1200 further includes receiving ACKs or NACKs in response to receiving the PDSCHs, wherein the ACKs or NACKs indicate the HARQ IDs of the PDSCHs.

In some aspects, the method 1200 further includes transmitting, in the DCI, at least one indication of a HARQ ID corresponding to each of the at least two PDSCHs.

In some aspects, the at least one indication of the HARQ ID corresponding to each of the at least two PDSCHs comprises a value of a HARQ ID field in the DCI indicating a first HARQ ID (wherein the first HARQ ID corresponds to the first PDSCH of the at least two PDSCHs), a HARQ process ID offset, and a number of HARQ processes for the retransmissions of the at least two PDSCHs.

In some aspects, the method 1200 further includes transmitting a RRC configuration parameter indicating a set of HARQ IDs, allowed for the DCI and corresponding to each of the at least two PDSCHs, belongs to a single SPS. In some aspects, the method 1200 further includes determining the first HARQ ID such that a HARQ ID corresponding to a PDSCH after the first PDSCH of the at least two PDSCHs is calculated as: (previousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

In some aspects, the method 1200 further includes indicating, in the DCI, a number of HARQ IDs to be skipped.

In some aspects, the method 1200 further includes indicating, in a NDI bitmap in the DCI, one or more HARQ IDs to be skipped.

In some aspects, the method 1200 further includes transmitting a RRC configuration parameter indicating a set of SPSs allowed for the DCI, determining a set of HARQ IDs allowed for the DCI based at least in part on a number of SPSs in the set of SPSs allowed for the DCI and the first HARQ ID, and determining the NDI bitmap based on the set of HARQ IDs allowed for the DCI.

In some aspects, the method 1200 further includes transmitting RRC signaling assigning each SPS to a group, determining a group of SPSs based at least in part on the first HARQ ID, and determining the HARQ process ID offset based at least in part on the determined group of SPSs.

Example Wireless Communication Devices

Figure 13:
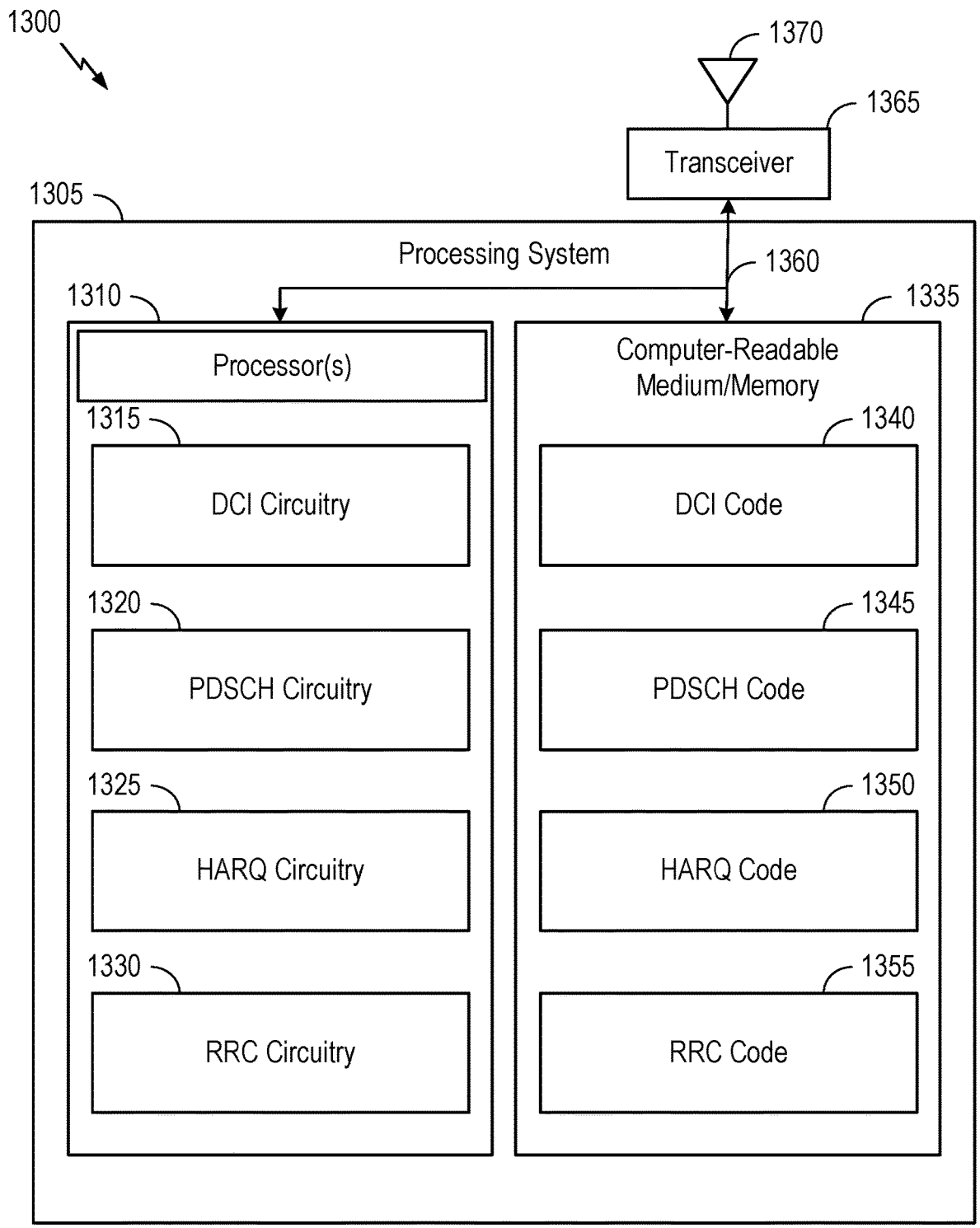
FIGS. 13 and 14 depict example communications devices according to aspects of the present disclosure.

FIG. 13 depicts an example communications device 1300 that includes various components operable, configured, or adapted to perform operations for the techniques disclosed herein, such as the operations depicted and described with respect to FIG. 11. In some examples, communication device may be a UE 104 as described, for example with respect to FIGS. 1 and 2.

Communications device 1300 includes a processing system 1305 coupled to the transceiver 1365 (e.g., a transmitter and/or a receiver). The transceiver 1365 is configured to transmit (or send) and receive signals for the communications device 1300 via the antenna 1370, such as the various signals as described herein. The transceiver 1365 may communicate bi-directionally, via the antennas 1370, wired links, or wireless links as described herein. For example, the transceiver 1365 may represent a wireless transceiver and may communicate bi-directionally with another wireless transceiver. The transceiver 1365 may also include or be connected to a modem to modulate the packets and provide the modulated packets to for transmission, and to demodulate received packets. In some examples, the transceiver 1365 may be tuned to operate at specified frequencies. For example, a modem can configure the transceiver 1365 to operate at a specified frequency and power level based on the communication protocol used by the modem.

Processing system 1305 may be configured to perform processing functions for communications device 1300, including processing signals received and/or to be transmitted by communications device 1300. Processing system 1305 includes one or more processors 1310 coupled to a computer-readable medium/memory 1335 via a bus 1360.

In some examples, one or more processors 1310 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1310 are configured to operate a memory array using a memory controller. In other cases, a memory controller is integrated into the one or more processors 1310. In some cases, the one or more processors 1310 are configured to execute computer-readable instructions stored in a memory to perform various functions. In some aspects, one or more processors 1310 include special purpose components for modem processing, baseband processing, digital signal processing, or transmission processing.

In certain aspects, computer-readable medium/memory 1335 is configured to store instructions (e.g., computer executable code) that when executed by the one or more processors 1310, cause the one or more processors 1310 to perform the operations illustrated in FIG. 11, or other operations for performing the various techniques discussed herein.

In one aspect, computer-readable medium/memory 1335 includes DCI code 1340, PDSCH code 1345, HARQ code 1350, and RRC code 1355.

Examples of a computer readable medium/memory 1335 include random access memory (RAM), read-only memory (ROM), solid state memory, a hard drive, a hard disk drive, etc. In some examples, computer readable medium/memory 1335 is used for storing computer readable, computer executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1300 may provide means for performing the methods described herein, including with respect to FIG. 11.

In some examples, means for transmitting or sending (or means for outputting for transmission) may include transceivers 254 and/or antenna(s) 252 of the UE 104 illustrated in FIG. 2 and/or the transceiver 1365 and the antenna 1370 of the communication device in FIG. 13.

In some examples, means for receiving (or means for obtaining) may include transceivers 254 and/or antenna(s) 252 of the UE 104 illustrated in FIG. 2 and/or the transceiver 1365 and the antenna 1370 of the communication device in FIG. 13.

In some examples, means for receiving, transmitting, determining, indicating, or calculating may include various processing system 1305 components, such as: the one or more processors 1310 in FIG. 13, or aspects of the UE 104 depicted in FIG. 2, including receive processor 258, transmit processor 264, TX MIMO processor 266, and/or controller/processor 280 (including retransmission component 281).

In one aspect, one or more processors 1310 includes DCI circuitry 1315, PDSCH circuitry 1320, HARQ circuitry 1325, and RRC circuitry 1330.

According to some aspects, DCI circuitry 1315 receives a DCI that schedules retransmission of at least two SPS PDSCHs that have HARQ IDs.

According to some aspects, PDSCH circuitry 1320 receives the retransmissions of the at least two PDSCHs. In some aspects, receiving the retransmissions includes combining the retransmitted PDSCHs with previously received PDSCHs having same HARQ IDs.

According to some aspects, HARQ circuitry 1325 transmits one or more ACKs or NACKs in response to receiving the PDSCHs, where the ACKs or NACKs indicate the HARQ IDs of the PDSCHs.

In some examples, HARQ circuitry 1325 determines, based on information in the DCI, a HARQ ID corresponding to each of the at least two PDSCHs.

In some aspects, determining the HARQ ID corresponding to each of the at least two PDSCHs includes: determining a first HARQ ID based on a value of a HARQ ID field in the DCI, where the first HARQ ID corresponds to the first PDSCH of the at least two PDSCHs; and determining the HARQ ID corresponding to each of the at least two PDSCHs, other than the first PDSCH, based on the first HARQ ID, a set of HARQ IDs allowed for the DCI, a HARQ process ID offset, and one or more configurations of one or more SPSs.

In some aspects, determining the HARQ ID corresponding to each of the at least two PDSCHs further includes: receiving (e.g., via RRC circuitry 1330) a RRC configuration parameter indicating a set of HARQ IDs, allowed for the DCI and corresponding to each of the at least two PDSCHs, belongs to a single SPS; and calculating (e.g., via HARQ circuitry 1325) a HARQ ID corresponding to a PDSCH after the first PDSCH of the at least two PDSCHs as: (previousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

In some aspects, determining the HARQ ID corresponding to each of the at least two PDSCHs is further based on a number of HARQ IDs to be skipped indicated in the DCI.

In some examples, HARQ circuitry 1325 determines, based on a NDI bitmap in the DCI, one or more HARQ IDs to be skipped. In some examples, HARQ circuitry 1325 determines the number of HARQ IDs to be skipped based on the NDI bitmap. In some examples, HARQ circuitry 1325 determines a SLIV for each of the at least two PDSCHs based on the one or more HARQ IDs to be skipped.

In some examples, RRC circuitry 1330 receives RRC signaling assigning each SPS to a group. In some examples, HARQ circuitry 1325 determines a group of SPSs based on the first HARQ ID. In some examples, HARQ circuitry 1325 determines the set of HARQ IDs allowed for the DCI and the HARQ process ID offset based on the determined group of SPSs.

According to some aspects, RRC circuitry 1330 receives a RRC configuration parameter indicating a set of SPSs allowed for the DCI. In some examples HARQ circuitry 1325 determines the set of HARQ IDs allowed for the DCI and the HARQ process ID offset based on a number of SPSs in the set of SPSs allowed for the DCI and the first HARQ ID.

Notably, FIG. 13 is just one example, and many other examples and configurations of communication device are possible.

Figure 14:
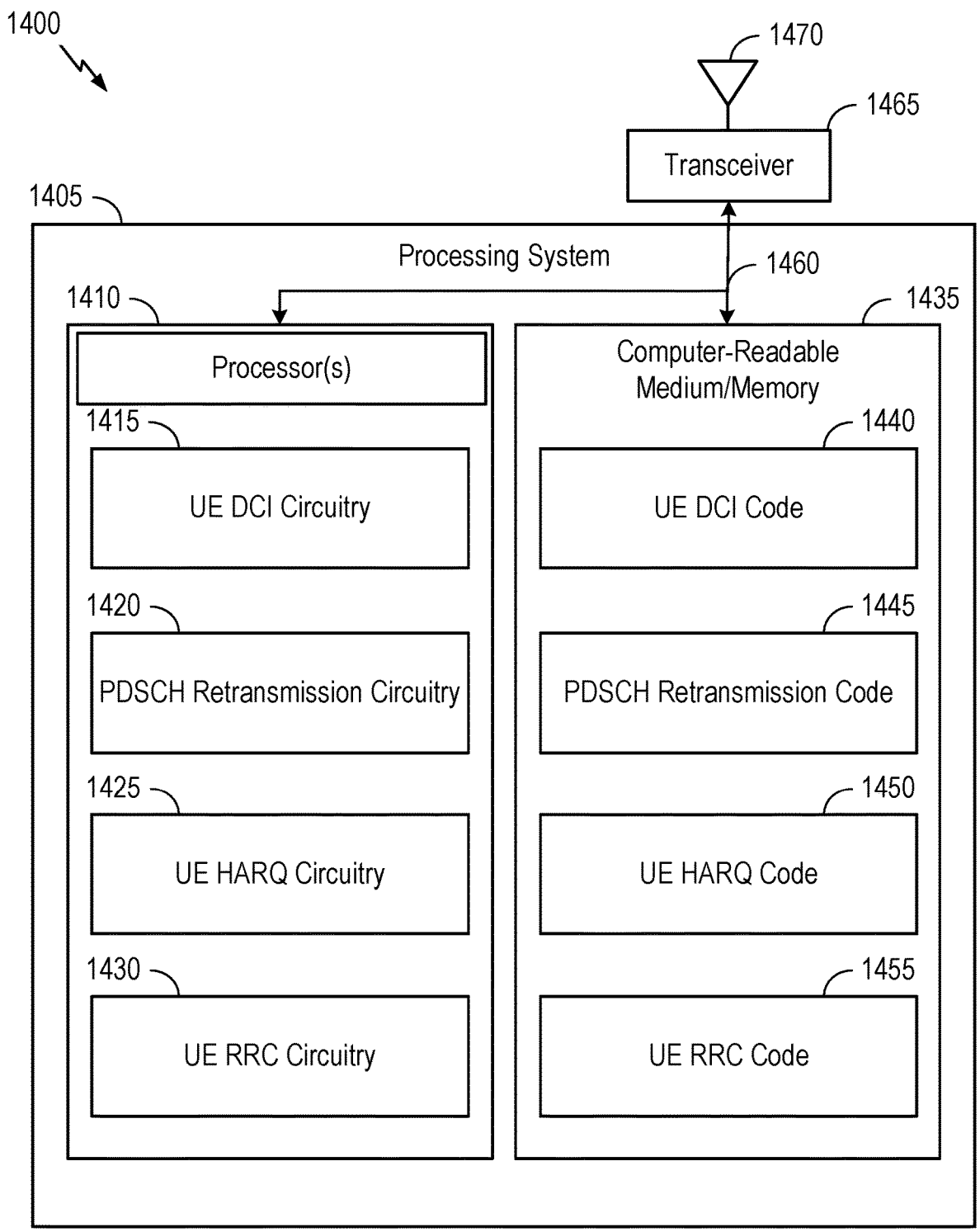

FIG. 14 depicts an example communications device 1400 that includes various components operable, configured, or adapted to perform operations for the techniques disclosed herein, such as the operations depicted and described with respect to FIG. 12. In some examples, communication device may be a BS 102 as described, for example with respect to FIGS. 1 and 2.

Communications device 1400 includes a processing system 1405 coupled to the transceiver 1465 (e.g., a transmitter and/or a receiver). The transceiver 1465 is configured to transmit (or send) and receive signals for the communications device 1400 via the antenna 1470, such as the various signals as described herein. The transceiver 1465 may communicate bi-directionally, via the antennas 1470, wired links, or wireless links as described herein. For example, the transceiver 1465 may represent a wireless transceiver and may communicate bi-directionally with another wireless transceiver. The transceiver 1465 may also include or be connected to a modem to modulate the packets and provide the modulated packets to for transmission, and to demodulate received packets. In some examples, the transceiver 1465 may be tuned to operate at specified frequencies. For example, a modem can configure the transceiver 1465 to operate at a specified frequency and power level based on the communication protocol used by the modem.

Processing system 1405 may be configured to perform processing functions for communications device 1400, including processing signals received and/or to be transmitted by communications device 1400. Processing system 1405 includes one or more processors 1410 coupled to a computer-readable medium/memory 1435 via a bus 1460.

In some examples, one or more processors 1410 may include one or more intelligent hardware devices, (e.g., a general-purpose processing component, a DSP, a CPU, a GPU, a microcontroller, an ASIC, a FPGA, a programmable logic device, a discrete gate or transistor logic component, a discrete hardware component, or any combination thereof). In some cases, the one or more processors 1410 are configured to operate a memory array using a memory controller. In other cases, a memory controller is integrated into the one or more processors 1410. In some cases, the one or more processors 1410 are configured to execute computer-readable instructions or code stored in a memory to perform various functions. In some aspects, one or more processors 1410 include special purpose components for modem processing, baseband processing, digital signal processing, or transmission processing.

In certain aspects, computer-readable medium/memory 1435 is configured to store instructions (e.g., computer executable code) that when executed by the one or more processors 1410, cause the one or more processors 1410 to perform the operations illustrated in FIG. 12, or other operations for performing the various techniques discussed herein.

In one aspect, computer-readable medium/memory 1435 includes UE DCI code 1440, PDSCH retransmission code 1445, UE HARQ code 1450, and UE RRC code 1455.

Examples of a computer-readable medium/memory 1435 include random access memory (RAM), read-only memory (ROM), solid state memory, a hard drive, a hard disk drive, etc. In some examples, computer readable medium/memory 1435 is used for storing computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1400 may provide means for performing the methods described herein, including with respect to FIG. 12.

In some examples, means for transmitting or sending (or means for outputting for transmission) may include transceivers 232 and/or antenna(s) 234 of the BS 102 illustrated in FIG. 2 and/or the transceiver 1465 and the antenna 1470 of the communication device in FIG. 14.

In some examples, means for receiving (or means for obtaining) may include transceivers 232 and/or antenna(s) 234 of the BS 102 illustrated in FIG. 2 and/or the transceiver 1465 and the antenna 1470 of the communication device in FIG. 14.

In some examples, means for transmitting, receiving, determining, indicating, and calculating may include various processing system 1405 components, such as: the one or more processors 1410 in FIG. 14, or aspects of the BS 102 depicted in FIG. 2, including receive processor 238, transmit processor 220, TX MIMO processor 230, and/or controller/processor 240 (including retransmission component 241).

In one aspect, one or more processors 1410 includes UE DCI circuitry 1415, PDSCH retransmission circuitry 1420, UE HARQ circuitry 1425, and UE RRC circuitry 1430.

According to some aspects, UE DCI circuitry 1415 transmits a DCI that schedules retransmission of at least two SPS PDSCHs that have HARQ IDs.

According to some aspects, PDSCH retransmission circuitry 1420 transmits the retransmissions of the at least two PDSCHs. In some aspects, transmitting the retransmissions of the at least two PDSCHs includes transmitting RVs of the PDSCHs that are different from RVs of original transmissions of the PDSCHs.

According to some aspects, UE HARQ circuitry 1425 receives ACKs or NACKs in response to receiving the PDSCHs, where the ACKs or NACKs indicate the HARQ IDs of the PDSCHs.

In some examples, UE DCI circuitry 1415 transmits, in the DCI, at least one indication of a HARQ ID corresponding to each of the at least two PDSCHs. In some aspects, the at least one indication of the HARQ ID corresponding to each of the at least two PDSCHs includes a value of a HARQ ID field in the DCI indicating a first HARQ ID (where the first HARQ ID corresponds to the first PDSCH of the at least two PDSCHs), a HARQ process ID offset, and a number of HARQ processes for the retransmissions of the at least two PDSCHs.

In some examples, UE DCI circuitry 1415 indicates, in the DCI, a number of HARQ IDs to be skipped. In some examples, UE DCI circuitry 1415 indicates, in a NDI bitmap in the DCI, one or more HARQ IDs to be skipped.

According to some aspects, UE RRC circuitry 1430 transmits a RRC configuration parameter indicating a set of HARQ IDs, allowed for the DCI and corresponding to each of the at least two PDSCHs, belongs to a single SPS. In some examples, UE HARQ circuitry 1425 determines the first HARQ ID such that a HARQ ID corresponding to a PDSCH after the first PDSCH of the at least two PDSCHs is calculated as: (previousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

In some examples, UE RRC circuitry 1430 transmits a RRC configuration parameter indicating a set of SPSs allowed for the DCI. In some examples, UE HARQ circuitry 1425 determines a set of HARQ IDs allowed for the DCI based on a number of SPSs in the set of SPSs allowed for the DCI and the first HARQ ID. In some examples, UE HARQ circuitry 1425 determines the NDI bitmap based on the set of HARQ IDs allowed for the DCI.

In some examples, UE RRC circuitry 1430 transmits RRC signaling assigning each SPS to a group. In some examples, UE HARQ circuitry 1425 determines a group of SPSs based on the first HARQ ID. In some examples, UE HARQ circuitry 1425 determines the HARQ process ID offset based on the determined group of SPSs.

Notably, FIG. 14 is just one example, and many other examples and configurations of communication device are possible.

Example Clauses

Implementation examples are described in the following numbered clauses:

Clause 1: A method for wireless communications by a user equipment (UE), the method comprising: receiving a downlink control information (DCI) that schedules retransmission of at least two semi-persistently scheduled (SPS) physical downlink shared channels (PDSCHs) that have hybrid automatic retransmission request (HARQ) identifier (IDs); and receiving the retransmissions of the at least two PDSCHs.

Clause 2: The method of Clause 1, wherein: receiving the retransmissions comprises combining the retransmitted PDSCHs with previously received PDSCHs having same HARQ IDs.

Clause 3: The method of any one of Clauses 1 and 2, further comprising: transmitting one or more acknowledgments (ACKs) or negative acknowledgments (NACKs) in response to receiving the PDSCHs, wherein the ACKs or NACKs indicate the HARQ IDs of the PDSCHs.

Clause 4: The method of any one of Clauses 1-3, further comprising: determining, based at least in part on information in the DCI, a HARQ ID corresponding to each of the at least two PDSCHs.

Clause 5: The method of Clause 4, wherein determining the HARQ ID corresponding to each of the at least two PDSCHs comprises: determining a first HARQ ID based on a value of a HARQ ID field in the DCI, wherein the first HARQ ID corresponds to the first PDSCH of the at least two PDSCHs; and determining the HARQ ID corresponding to each of the at least two PDSCHs, other than the first PDSCH, based on the first HARQ ID, a set of HARQ IDs allowed for the DCI, a HARQ process ID offset, and one or more configurations of one or more SPSs.

Clause 6: The method of Clause 5, wherein determining the HARQ ID corresponding to each of the at least two PDSCHs further comprises: receiving a radio resource control (RRC) configuration parameter indicating a set of HARQ IDs, allowed for the DCI and corresponding to each of the at least two PDSCHs, belongs to a single SPS; and calculating a HARQ ID corresponding to a PDSCH after the first PDSCH of the at least two PDSCHs as: (previousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

Clause 7: The method of Clause 5, wherein determining the HARQ ID corresponding to each of the at least two PDSCHs is further based on a number of HARQ IDs to be skipped indicated in the DCI.

Clause 8: The method of Clause 7, further comprising: determining, based on a new data indicator (NDI) bitmap in the DCI, one or more HARQ IDs to be skipped; determining the number of HARQ IDs to be skipped based on the NDI bitmap; and determining a start and length indicator value (SLIV) for each of the at least two PDSCHs based at least in part on the one or more HARQ IDs to be skipped.

Clause 9: The method of Clause 8, further comprising: receiving a radio resource control (RRC) configuration parameter indicating a set of SPSs allowed for the DCI; and determining the set of HARQ IDs allowed for the DCI and the HARQ process ID offset based at least in part on a number of SPSs in the set of SPSs allowed for the DCI and the first HARQ ID.

Clause 10: The method of Clause 8, further comprising: receiving radio resource control (RRC) signaling assigning each SPS to a group; determining a group of SPSs based at least in part on the first HARQ ID; and determining the set of HARQ IDs allowed for the DCI and the HARQ process ID offset based at least in part on the determined group of SPSs.

Clause 11: A method for wireless communications by a base station (BS). The method comprising: transmitting a downlink control information (DCI) that schedules retransmission of at least two semi-persistently scheduled (SPS) physical downlink shared channels (PDSCHs) that have hybrid automatic retransmission request (HARQ) identifier (IDs); and transmitting the retransmissions of the at least two PDSCHs.

Clause 12: The method of Clause 11, wherein: transmitting the retransmissions of the at least two PDSCHs comprises: transmitting redundancy versions (RVs) of the PDSCHs that are different from RVs of original transmissions of the PDSCHs.

Clause 13: The method of any one of Clauses 11 and 12, further comprising: receiving acknowledgments (ACKs) or negative acknowledgments (NACKs) in response to receiving the PDSCHs, wherein the ACKs or NACKs indicate the HARQ IDs of the PDSCHs.

Clause 14: The method of any one of Clauses 11-13, further comprising: transmitting, in the DCI, at least one indication of a HARQ ID corresponding to each of the at least two PDSCHs.

Clause 15: The method of Clause 14, wherein: the at least one indication of the HARQ ID corresponding to each of the at least two PDSCHs comprises a value of a HARQ ID field in the DCI indicating a first HARQ ID (wherein the first HARQ ID corresponds to the first PDSCH of the at least two PDSCHs), a HARQ process ID offset, and a number of HARQ processes for the retransmissions of the at least two PDSCHs.

Clause 16: The method of Clause 15, further comprising: transmitting a radio resource control (RRC) configuration parameter indicating a set of HARQ IDs, allowed for the DCI and corresponding to each of the at least two PDSCHs, belongs to a single SPS; and determining the first HARQ ID such that a HARQ ID corresponding to a PDSCH after the first PDSCH of the at least two PDSCHs is calculated as: (previousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

Clause 17: The method of Clause 15, further comprising: indicating, in the DCI, a number of HARQ IDs to be skipped.

Clause 18: The method of Clause 17, further comprising: indicating, in a new data indicator (NDI) bitmap in the DCI, one or more HARQ IDs to be skipped.

Clause 19: The method of Clause 18, further comprising: transmitting a radio resource control (RRC) configuration parameter indicating a set of SPSs allowed for the DCI; determining a set of HARQ IDs allowed for the DCI based at least in part on a number of SPSs in the set of SPSs allowed for the DCI and the first HARQ ID; and determining the NDI bitmap based on the set of HARQ IDs allowed for the DCI.

Clause 20: The method of Clause 18, further comprising: transmitting radio resource control (RRC) signaling assigning each SPS to a group; determining a group of SPSs based at least in part on the first HARQ ID; determining the HARQ process ID offset based at least in part on the determined group of SPSs.

Clause 21: An apparatus, comprising: a memory comprising executable instructions; and at least one processor configured to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by one or more processors of an apparatus, cause the apparatus to perform a method in accordance with any one of Clauses 1-20.

Clause 24: A computer program product embodied on a computer-readable storage medium comprising code for performing a method in accordance with any one of Clauses 1-20.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mm-Wave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of transmitting downlink control information (DCI) to schedule retransmissions of semi-persistently scheduled (SPS) physical downlink shared channels (PDSCHs) that were not successfully received in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code executable by a processor(s) on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), the method comprising:
   receiving a message indicating that hybrid automatic retransmission request (HARQ) identifier (IDs) will wrap around after reaching a first value;
   receiving a downlink control information (DCI) that schedules retransmission of at least two semi-persistently scheduled (SPS) physical downlink shared channels (PDSCHs) that have HARQ IDs; and
receiving the retransmissions of the at least two PDSCHs.

2. The method of claim 1, wherein receiving the retransmissions comprises combining the retransmitted PDSCHs with previously received PDSCHs having same HARQ IDs.

3. The method of claim 1, further comprising:
transmitting one or more acknowledgments (ACKs) or negative acknowledgments (NACKs) in response to receiving the PDSCHs, wherein the ACKs or NACKs indicate the HARQ IDs of the PDSCHs.

4. The method of claim 1, further comprising:
determining, based at least in part on information in the DCI, a HARQ ID corresponding to each of the at least two PDSCHs.

5. The method of claim 4, wherein determining the HARQ ID corresponding to each of the at least two PDSCHs comprises:
determining a first HARQ ID based on a value of a HARQ ID field in the DCI, wherein the first HARQ ID corresponds to the first PDSCH of the at least two PDSCHs; and
determining the HARQ ID corresponding to each of the at least two PDSCHs, other than the first PDSCH, based on the first HARQ ID, a set of HARQ IDs allowed for the DCI, a HARQ process ID offset, and one or more configurations of one or more SPSs.

6. The method of claim 5, wherein determining the HARQ ID corresponding to each of the at least two PDSCHs further comprises:
receiving a radio resource control (RRC) configuration parameter indicating a set of HARQ IDs, allowed for the DCI and corresponding to each of the at least two PDSCHs, belongs to a single SPS; and
calculating a HARQ ID corresponding to a PDSCH after the first PDSCH of the at least two PDSCHs as: (previousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

7. The method of claim 5, wherein determining the HARQ ID corresponding to each of the at least two PDSCHs is further based on a number of HARQ IDs to be skipped indicated in the DCI.

8. The method of claim 7, further comprising:
determining, based on a new data indicator (NDI) bitmap in the DCI, one or more HARQ IDs to be skipped;
determining the number of HARQ IDs to be skipped based on the NDI bitmap; and
determining a start and length indicator value (SLIV) for each of the at least two PDSCHs based at least in part on the one or more HARQ IDs to be skipped.

9. The method of claim 8, further comprising:
receiving a radio resource control (RRC) configuration parameter indicating a set of SPSs allowed for the DCI; and
determining the set of HARQ IDs allowed for the DCI and the HARQ process ID offset based at least in part on a number of SPSs in the set of SPSs allowed for the DCI and the first HARQ ID.

10. The method of claim 8, further comprising:
receiving radio resource control (RRC) signaling assigning each SPS to a group;
determining a group of SPSs based at least in part on the first HARQ ID; and
determining the set of HARQ IDs allowed for the DCI and the HARQ process ID offset based at least in part on the determined group of SPSs.

11. A method for wireless communications by a base station (BS), the method comprising:
transmitting a message indicating that hybrid automatic retransmission request (HARQ) identifier (IDs) will wrap around after reaching a first value;
transmitting a downlink control information (DCI) that schedules retransmission of at least two semi-persistently scheduled (SPS) physical downlink shared channels (PDSCHs) that have HARQ IDs; and
transmitting the retransmissions of the at least two PDSCHs.

12. The method of claim 11, wherein transmitting the retransmissions of the at least two PDSCHs comprises transmitting redundancy versions (RVs) of the PDSCHs that are different from RVs of original transmissions of the PDSCHs.

13. The method of claim 11, further comprising:
receiving acknowledgments (ACKs) or negative acknowledgments (NACKs) in response to receiving the PDSCHs, wherein the ACKs or NACKs indicate the HARQ IDs of the PDSCHs.

14. The method of claim 11, further comprising:
transmitting, in the DCI, at least one indication of a HARQ ID corresponding to each of the at least two PDSCHs.

15. The method of claim 14, wherein the at least one indication of the HARQ ID corresponding to each of the at least two PDSCHs comprises:
a value of a HARQ ID field in the DCI indicating a first HARQ ID, wherein the first HARQ ID corresponds to the first PDSCH of the at least two PDSCHs;
a HARQ process ID offset; and
a number of HARQ processes for the retransmissions of the at least two PDSCHs.

16. The method of claim 15, further comprising:
transmitting a radio resource control (RRC) configuration parameter indicating a set of HARQ IDs, allowed for the DCI and corresponding to each of the at least two PDSCHs, belongs to a single SPS; and
determining the first HARQ ID such that a HARQ ID corresponding to a PDSCH after the first PDSCH of the at least two PDSCHs is calculated as: (previousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

17. The method of claim 15, further comprising indicating, in the DCI, a number of HARQ IDs to be skipped.

18. The method of claim 17, further comprising:
indicating, in a new data indicator (NDI) bitmap in the DCI, one or more HARQ IDs to be skipped.

19. The method of claim 18, further comprising:
transmitting a radio resource control (RRC) configuration parameter indicating a set of SPSs allowed for the DCI;
determining a set of HARQ IDs allowed for the DCI based at least in part on a number of SPSs in the set of SPSs allowed for the DCI and the first HARQ ID; and determining the NDI bitmap based on the set of HARQ IDs allowed for the DCI.

20. The method of claim 18, further comprising:
transmitting radio resource control (RRC) signaling assigning each SPS to a group;
determining a group of SPSs based at least in part on the first HARQ ID; and
determining the HARQ process ID offset based at least in part on the determined group of SPSs.

21. An apparatus for wireless communications, comprising:
a receiver;
at least one processor; and
a memory coupled to the at least one processor, the memory comprising code executable by the at least one processor to cause the apparatus to:
receive, via the receiver, a message indicating that hybrid automatic retransmission request (HARQ) identifier (IDs) will wrap around after reaching a first value;
receive, via the receiver, a downlink control information (DCI) that schedules retransmission of at least two semi-persistently scheduled (SPS) physical downlink shared channels (PDSCHs) that have HARQ IDs; and
receive, via the receiver, the retransmissions of the at least two PDSCHs.

22. The apparatus of claim 21, wherein the memory further comprises code executable by the at least one processor to cause the apparatus to combine the retransmitted PDSCHs with previously received PDSCHs having same HARQ IDs.

23. The apparatus of claim 21, wherein the memory further comprises code executable by the at least one processor to cause the apparatus to determine, based at least in part on information in the DCI, a HARQ ID corresponding to each of the at least two PDSCHs.

24. The apparatus of claim 23, wherein the code executable by the at least one processor to cause the apparatus to determine the HARQ ID corresponding to each of the at least two PDSCHs comprises code executable by the at least one processor to cause the apparatus to:
determine a first HARQ ID based on a value of a HARQ ID field in the DCI, wherein the first HARQ ID corresponds to the first PDSCH of the at least two PDSCHs; and
determine the HARQ ID corresponding to each of the at least two PDSCHs, other than the first PDSCH, based on the first HARQ ID, a set of HARQ IDs allowed for the DCI, a HARQ process ID offset, and one or more configurations of one or more SPSs.

25. The apparatus of claim 24, wherein the code executable by the at least one processor to cause the apparatus to determine the HARQ ID corresponding to each of the at least two PDSCHs further comprises code executable by the at least one processor to cause the apparatus to:
receive, via the receiver, a radio resource control (RRC) configuration parameter indicating a set of HARQ IDs, allowed for the DCI and corresponding to each of the at least two PDSCHs, belongs to a single SPS; and
calculate a HARQ ID corresponding to a PDSCH after the first PDSCH of the at least two PDSCHs as: (previousHarqID+1) modulo (NumofHarqProcesses+HarqProcessOffset)+HarqProcessOffset, wherein previousHarqID is a HARQ ID corresponding to another PDSCH immediately before the PDSCH after the first PDSCH of the at least two PDSCHs, NumofHarqProcesses is a number of HARQ processes allowed for the single SPS, and HarqProcessOffset is the HARQ process ID offset for the single SPS.

26. The apparatus of claim 24, wherein the code executable by the at least one processor to cause the apparatus to determine the HARQ ID corresponding to each of the at least two PDSCHs is executable by the at least one processor to cause the apparatus to determine the HARQ IDs further based on a number of HARQ IDs to be skipped indicated in the DCI.

27. The apparatus of claim 26, wherein the code executable by the at least one processor to cause the apparatus to determine the HARQ ID corresponding to each of the at least two PDSCHs further comprises code executable by the at least one processor to cause the apparatus to:
determine, based on a new data indicator (NDI) bitmap in the DCI, one or more HARQ IDs to be skipped;
determine the number of HARQ IDs to be skipped based on the NDI bitmap; and
determine a start and length indicator value (SLIV) for each of the at least two PDSCHs based at least in part on the one or more HARQ IDs to be skipped.

28. The apparatus of claim 27, wherein the code executable by the at least one processor further comprises code executable by the at least one processor to cause the apparatus to:
receive, via the receiver, a radio resource control (RRC) configuration parameter indicating a set of SPSs allowed for the DCI; and
determine the set of HARQ IDs allowed for the DCI and the HARQ process ID offset based at least in part on a number of SPSs in the set of SPSs allowed for the DCI and the first HARQ ID.

29. The apparatus of claim 27, wherein the code executable by the at least one processor further comprises code executable by the at least one processor to cause the apparatus to:
receive, via the receiver, radio resource control (RRC) signaling assigning each SPS to a group;
determine a group of SPSs based at least in part on the first HARQ ID; and
determine the set of HARQ IDs allowed for the DCI and the HARQ process ID offset based at least in part on the determined group of SPSs.

30. A computer readable medium storing computer executable code thereon for wireless communications, comprising:
code for receiving a message indicating that hybrid automatic retransmission request (HARQ) identifier (IDs) will wrap around after reaching a first value;
code for receiving a downlink control information (DCI) that schedules retransmission of at least two semi-persistently scheduled (SPS) physical downlink shared channels (PDSCHs) that have HARQ IDs; and
code for receiving the retransmissions of the at least two PDSCHs.

* * * * *